US008160090B2

(12) United States Patent
Yoshizawa et al.

(10) Patent No.: US 8,160,090 B2
(45) Date of Patent: Apr. 17, 2012

(54) COMMUNICATION APPARATUS FOR PERFORMING CONTENTION CONTROL

(75) Inventors: Kensuke Yoshizawa, Osaka (JP);
Youhei Koide, Osaka (JP); Toru Yasukawa, Wakayama (JP)

(73) Assignee: Panasonic Corporation, Osaka (JP)

( * ) Notice: Subject to any disclaimer, the term of this patent is extended or adjusted under 35 U.S.C. 154(b) by 17 days.

(21) Appl. No.: 12/304,808

(22) PCT Filed: Jun. 22, 2007

(86) PCT No.: PCT/JP2007/062615
§ 371 (c)(1),
(2), (4) Date: Mar. 23, 2009

(87) PCT Pub. No.: WO2008/010387
PCT Pub. Date: Jan. 24, 2008

(65) Prior Publication Data
US 2009/0310620 A1 Dec. 17, 2009

(30) Foreign Application Priority Data

Jul. 21, 2006 (JP) ................................. 2006-199392

(51) Int. Cl.
*H04L 12/42* (2006.01)
(52) U.S. Cl. ..................... 370/450; 370/252; 370/445
(58) Field of Classification Search .............. 370/232, 370/448, 447, 346, 352–356, 329–339, 458–463, 370/444–445, 252–253, 450–457
See application file for complete search history.

(56) References Cited

U.S. PATENT DOCUMENTS

| 6,813,260 B1* | 11/2004 | Fogle ............................ 370/338 |
| 7,233,603 B2* | 6/2007 | Lee ............................... 370/445 |
| 2005/0130713 A1* | 6/2005 | Simpson et al. ............... 455/574 |

FOREIGN PATENT DOCUMENTS

| JP | 6-169312 | 6/1994 |
| JP | 10-173663 | 6/1998 |
| JP | 2002-374264 | 12/2002 |
| JP | 3694844 | 7/2005 |

OTHER PUBLICATIONS

International Search Report mailed Jul. 31, 2007 for International Application No. PCT/JP2007/062615.

* cited by examiner

*Primary Examiner* — Pao Sinkantarakorn
*Assistant Examiner* — Iqbal Zaidi
(74) *Attorney, Agent, or Firm* — Wenderoth, Lind & Ponack, L.L.P.

(57) ABSTRACT

A communication apparatus improves the throughput of a whole communication system while performing contention distributed control which provides equality of a transmission chance by observing a medium occupation state. The communication apparatus includes a back-off process section for performing, using a contention window, a regular back-off process which is performed at transmission of a transmission frame and a pseudo back-off process which is performed in a pseudo manner when the transmission frame is not transmitted. The communication apparatus also includes a medium information obtaining section for obtaining, by the pseudo back-off process, medium information indicative of a state of the transmission line medium when the transmission frame is not transmitted, and a medium state determination section for determining the state of the transmission line medium using the medium information to obtain determination information.

8 Claims, 12 Drawing Sheets

F I G. 1
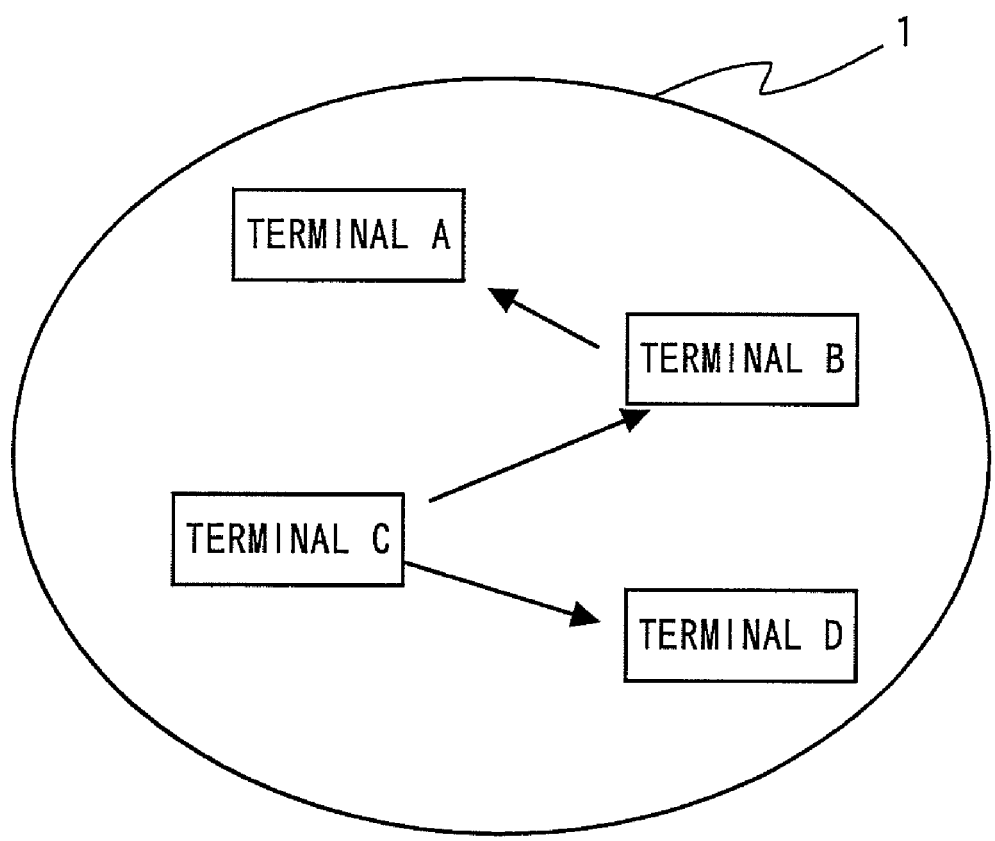

F I G. 1 5
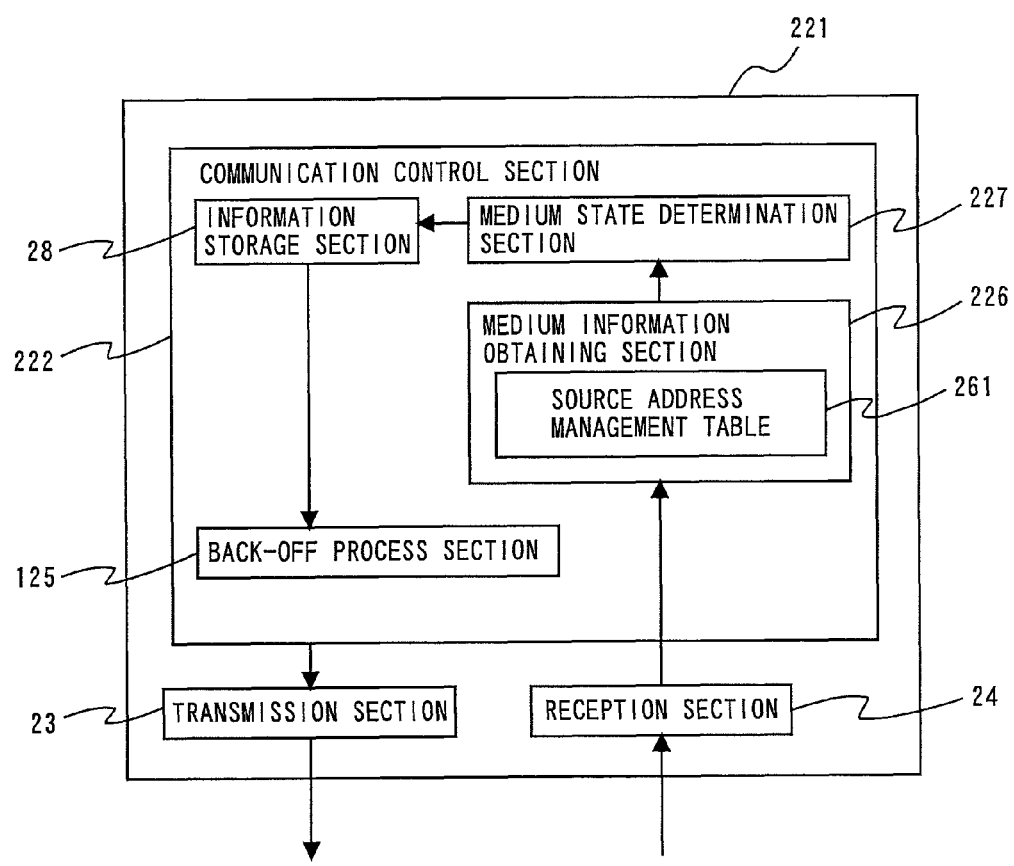

COMMUNICATION APPARATUS FOR PERFORMING CONTENTION CONTROL

TECHNICAL FIELD

The present invention relates to a communication apparatus constituting a part of a communication system in which a plurality of terminals perform packet communication using a common transmission line medium while contending with each other, and more particularly, to a communication apparatus using an access method for avoiding collisions by back-off control.

BACKGROUND ART

As a conventional technique for performing contention control to avoid collisions of transmitted data using back-off control, there is CSMA/CA (Carrier Sense Multiple Access/Collision Avoidance) for use in IEEE802.11 which is a standard for a wireless local area network (LAN). In this conventional technique, when a terminal which performs data transmission and the like detects a state (hereinafter, referred to as an idle state) where a transmission line medium is not occupied by a transmission data frame (hereinafter, referred to as a transmission frame), the terminal does not perform data transmission immediately, and determines a transmission timing, in a contention zone defined in a contention window (hereinafter, referred to as CW), by back-off control using random numbers whose maximum value is the number of slots in the CW.

Specifically, when the terminal which performs data transmission detects a state (hereinafter, referred to as an occupation state) where a transmission frame occupies the transmission line medium by a transmission timing, the terminal waits to transmit a transmission frame until transmission of the transmission frame is completed. On the other hand, when the terminal which performs data transmission does not detect that the transmission line medium is in an occupation state by a transmission timing, the terminal transmits a transmission frame at this transmission timing. Then, when the terminal which performs data transmission does not detect a response frame (ACK frame) after transmitting the transmission frame, the terminal determines that a collision of the transmission frame has occurred, and performs a retransmission process. In this case, the terminal which performs data transmission reduces a probability of re-collision by increasing the number of slots in the CW to set the size of the CW to be large (a binary random back-off algorithm).

Here, generally, all terminals are required to equally obtain a chance of performing data transmission. However, in the above conventional technique, when collision of transmission frames occurs frequently due to the transmission line medium having high traffic (being congested), inequality that a terminal which newly demands to perform transmission can transmit a transmission frame with a higher probability than the other terminals occurs (known as a capture effect). This is because while the CW size of a terminal which repeatedly performs retransmission of a transmission frame is set to be large, the CW size of the terminal which newly demands to perform transmission is small. Further, with an increase in the CW size of each terminal, a waiting time of each terminal until transmission rapidly increases, resulting in a reduction in the throughput of each terminal.

The above problem is caused by each terminal setting its CW size in accordance with only the result of a trial of transmission. In other words, the above problem is caused by a fact that collision is not avoided with a state of occupation of the transmission line medium by a transmission frame (hereinafter, referred to as a medium occupation state) being taken into account in the whole system.

For the above problem, means for efficiently avoiding collision by an access point dynamically updating a CW size based on a medium occupation state and statistical information in each terminal in a system and the like and notifying each terminal of the updated CW size is disclosed (Patent Document 1 and Patent Document 2). In the Patent Document 1, an access point obtains a predicted value for the number of users (the number of terminals) in operation, and notifies each terminal of a CW size in accordance with the number of users in operation. Further, when collision of transmission frames occurs, the access point notifies each terminal of a CW size obtained by taking into account the number of collisions, thereby avoiding collision. In the Patent Document 2, because the traffic of an access point is larger than those of the other terminals, the access point monitors a quantity of packets remaining in the buffer thereof. When the quantity of packets remaining in the buffer increases, the access point facilitates handling of packets by increasing the CW size of each terminal.

[Patent Document 1] Japanese Patent Laid-open Publication No. 2002-374264
[Patent Document 2] Japanese Patent No. 3694844

SUMMARY OF THE INVENTION

Problems to be Solved by the Invention

In a conventional configuration shown in the Patent Document 1, however, because it is assumed that the access point detects collision, there is a problem that the conventional configuration cannot be applied to a system in which an access point has difficulty in detecting collision or a system which does not include a central control terminal such as an access point. Further, even a system in which an access point is capable of detecting collision has a problem that it needs to have a redundant circuit and the like for collision detection.

Further, in a conventional configuration shown in the Patent Document 2, because equality of a transmission chance in contention control cannot be maintained between the access point and each terminal, there is a problem that the conventional configuration cannot be applied to a system which requires equality of a transmission chance. Further, when the conventional configuration is applied to a system which does not include a central control terminal such as an access point, there is a problem that the throughput of the whole system is considerably reduced by each terminal increasing the CW size of another terminal.

Therefore, an object of the present invention is to provide a communication apparatus which is applicable to a system without a central control terminal such as an access point and which improves the throughput of the whole communication system while performing contention distributed control which provides equally a transmission chance by easily observing a medium occupation state.

Solutions to the Problems

The present invention is directed to a communication apparatus, used within a communication system, for avoiding collision of a transmission frame, transmitted by another communication apparatus in the same communication system, in a transmission line medium using a back-off process. To achieve the above object, the communication apparatus according to the present invention comprises: a back-off process section for performing, using a contention window, a regular back-off process which is performed at transmission of a transmission frame and a pseudo back-off process which is performed in a pseudo manner when the transmission frame is not transmitted; a medium information obtaining section for obtaining, by the pseudo back-off process, medium information indicative of a state of the transmission line medium when the transmission frame is not transmitted; and a medium state determination section for determining the state of the transmission line medium using the medium information to obtain determination information.

Further, preferably, the medium information includes at least one of a trial number value of the pseudo back-off process, a contention loss number value indicative of a number of times which a pseudo transmission frame has not been transmitted, a contention win number value indicative of a number of times which the pseudo transmission frame has been transmitted, and a collision number value indicative of a number of times of collision of the pseudo transmission frame and the transmission frame in the transmission line medium.

Further, preferably, the determination information is information indicative of a contention window table or a calculation formula which is selected in accordance with a contention success probability obtained by dividing the contention win number value by the trial number value or a contention failure probability obtained by dividing the contention loss number value by the trial number value, and a size of the contention window is determined by the selected contention window table or calculation formula.

Further, preferably, the determination information is an initial value for the size of the contention window which initial value is selected in accordance with a contention success probability obtained by dividing the contention win number value by the trial number value or a contention failure probability obtained by dividing the contention loss number value by the trial number value.

Further, the communication apparatus of the present invention may notify other communication apparatuses in the communication system of the determination information.

Further, the determination information is a collision probability obtained by dividing the collision number value by the trial number value, and calculation of a transmission line change may be performed using a change amount of an occurrence rate of retransmission which is attributable to a change of a transmission line state and obtained by multiplying an occurrence rate of retransmission of the transmission frame by a value obtained by subtracting the collision probability from 1.

Further, the present invention is directed to a communication method, used within a communication system, for avoiding collision of a transmission frame, transmitted by a communication apparatus in the same communication system, in a transmission line medium using a back-off process. To achieve the above object, the communication method according to the present invention comprises the steps of: performing, using a contention window, a regular back-off process which is performed at transmission of a transmission frame and a pseudo back-off process which is performed in a pseudo manner when the transmission frame is not transmitted; obtaining, by the pseudo back-off process, medium information indicative of a state of the transmission line medium when the transmission frame is not transmitted; and determining the state of the transmission line medium using the medium information to obtain determination information.

Further, the present invention is directed to a program used by a communication apparatus, used within a communication system, for avoiding collision of a transmission frame, transmitted by another communication apparatus in the same communication system, in a transmission line medium using a back-off process. To achieve the above object, the program according to the present invention causes the communication apparatus to execute the steps of: performing, using a contention window, a regular back-off process which is performed at transmission of a transmission frame and a pseudo back-off process which is performed in a pseudo manner when the transmission frame is not transmitted; obtaining, by the pseudo back-off process, medium information indicative of a state of the transmission line medium when the transmission frame is not transmitted; and determining the state of the transmission line medium using the medium information to obtain determination information.

Further, the present invention is directed to a storage medium storing a program which is used by a communication apparatus, used within a communication system, for avoiding collision of a transmission frame, transmitted by another communication apparatus in the same communication system, in a transmission line medium using a back-off process. To achieve the above object, the storage medium according to the present invention records the program which causes the communication apparatus to execute the steps of: performing, using a contention window, a regular back-off process which is performed at transmission of a transmission frame and a pseudo back-off process which is performed in a pseudo manner when the transmission frame is not transmitted; obtaining, by the pseudo back-off process, medium information indicative of a state of the transmission line medium when the transmission frame is not transmitted; and determining the state of the transmission line medium using the medium information to obtain determination information.

Effect of the Invention

As described above, according to the communication apparatus of the present invention, a medium occupation state can be easily observed only by adding a simple configuration to a conventional apparatus for performing contention control without providing a central control terminal such as an access point. Thus, an appropriate CW size in accordance with the medium occupation state can be set, and calculation of a change of the transmission line state and the like are possible. As a result, according to the communication apparatus of the present invention, in a contention distributed control system, the throughput of the whole system can be improved while equality of a transmission chance is maintained among communication apparatuses.

BRIEF DESCRIPTION OF THE DRAWINGS

FIG. 1 shows an exemplary configuration of a communication system which contains a plurality of communication apparatuses according to a first embodiment of the present invention.

FIG. 15 is a view showing an exemplary configuration of a communication apparatus 221 according to a third embodiment of the present invention.

Figure 2:
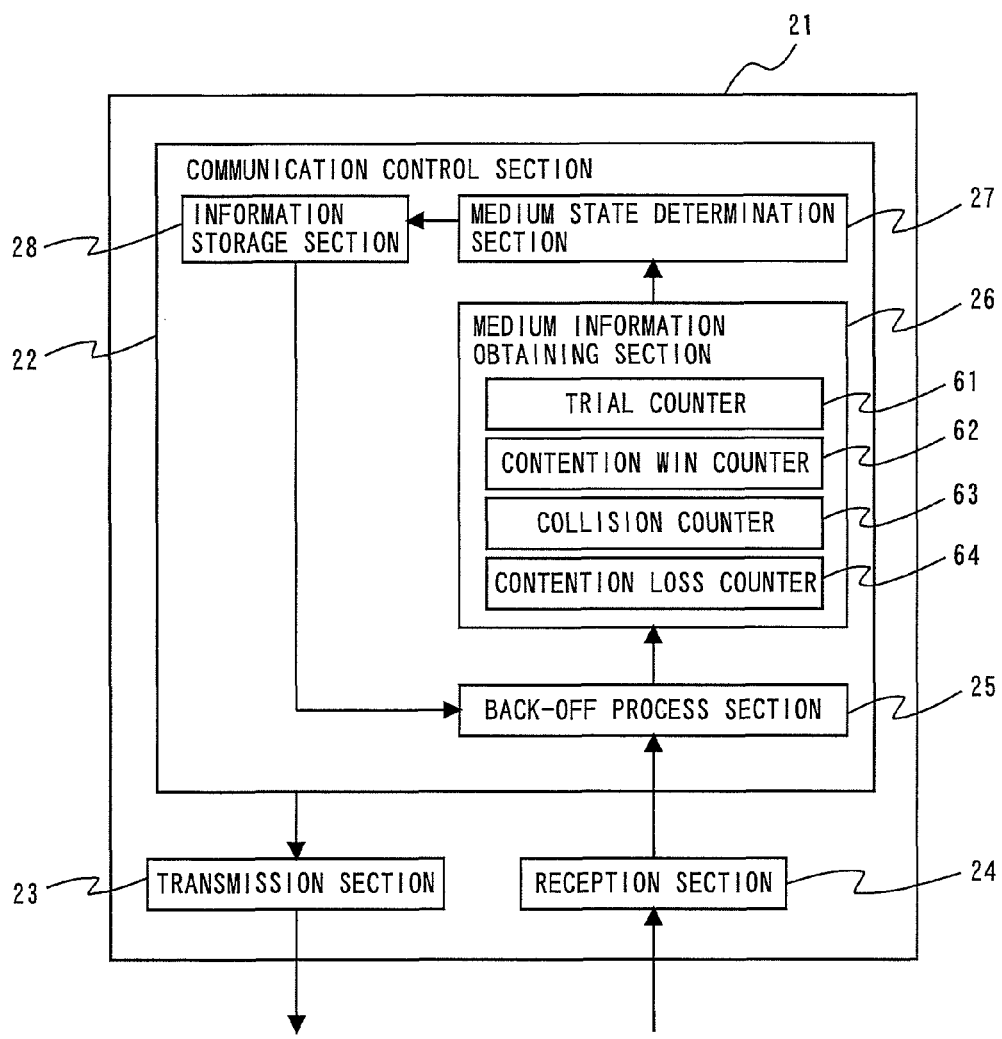
FIG. 2 a view showing an exemplary configuration of a communication apparatus 21 according to the first embodiment of the present invention.

DESCRIPTION OF THE REFERENCE CHARACTERS 1 communication system
21, 121, 221 communication apparatus
22, 122, 222 communication control section
23 transmission section
24 reception section
25, 125 back-off process section
26, 126, 226 medium information obtaining section
27, 127, 227 medium state determination section
28 information storage section
31 to 34, 171 to 175 transmission frame
41 to 43 pseudo transmission frame
51, 55 slot
52 to 54 pseudo transmission slot
61 trial counter
62 contention win counter
63 collision counter
64 contention loss counter
101, 102, 103 CW
161 frame length counter
261 source address management table

DETAILED DESCRIPTION OF THE INVENTION

First Embodiment

FIG. 1 shows an exemplary configuration of a communication system which contains a plurality of communication apparatuses according to a first embodiment of the present invention. The communication apparatuses (a terminal A, a terminal B, a terminal C, a terminal D) in the communication system 1 shown in FIG. 1 each transmit a transmission frame by autonomous distributed control using CSMA/CA. In FIG. 1, there are four terminals in the communication system 1, and a state wherein transmission of a transmission frame from the terminal B to the terminal A and transmission of a transmission frame from the terminal C to the terminal B and the terminal D are performed is shown. Further, a collision avoidance means used in this case is based on a conventional back-off process (hereinafter, referred to as a regular back-off process). It is noted that there is no limitation on the number of communication apparatuses in the communication system 1.

FIG. 2 is a view showing an exemplary configuration of a communication apparatus 21 according to the first embodiment of the present invention. As shown in FIG. 2, the communication apparatus 21 includes a transmission section 23 for performing modulation (e.g. OFDM modulation) of a transmission frame and performing an error correction encoding process and the like according to need, a reception section 24 for performing detection and demodulation of a received frame and performing an error correction process according to need, and a communication control section 22 for performing general communication control such as determination of a transmission timing based on CSMA/CA and a frame identification process. The communication control section 22 includes a back-off process section 25, a medium information obtaining section 26, a medium state determination section 27, and an information storage section 28. The medium information obtaining section 26 includes a trial counter 61, a contention win counter 62, a collision counter 63, and a contention loss counter 64. Although the back-off process section 25, the medium information obtaining section 26, the medium state determination section 27, and the information storage section 28 are separated from each other for convenience of explanation, they may be combined into a single configuration if the single configuration has the same function.

The following will describe briefly the characteristics of the communication apparatus 21 according to the first embodiment of the present invention prior to a detailed description about the operation of the communication apparatus 21. In addition to the regular back-off process which is performed only at transmission of a transmission frame by a conventional communication apparatus, the communication apparatus 21 has a characteristic of performing a pseudo back-off process on the assumption that a pseudo transmission frame is transmitted when a transmission frame is not transmitted (namely, a frame is not actually transmitted) (i.e., the transmission of the pseudo transmission frame is simulated). Further, the communication apparatus 21 has a characteristic of being able to use a back-off algorithm used in the regular back-off process as a back-off algorithm used in the pseudo back-off process without change. Further, the communication apparatus 21 has a characteristic of observing a medium occupation state by performing the pseudo back-off process, and changing a CW size of the communication apparatus 21.

Figure 3:
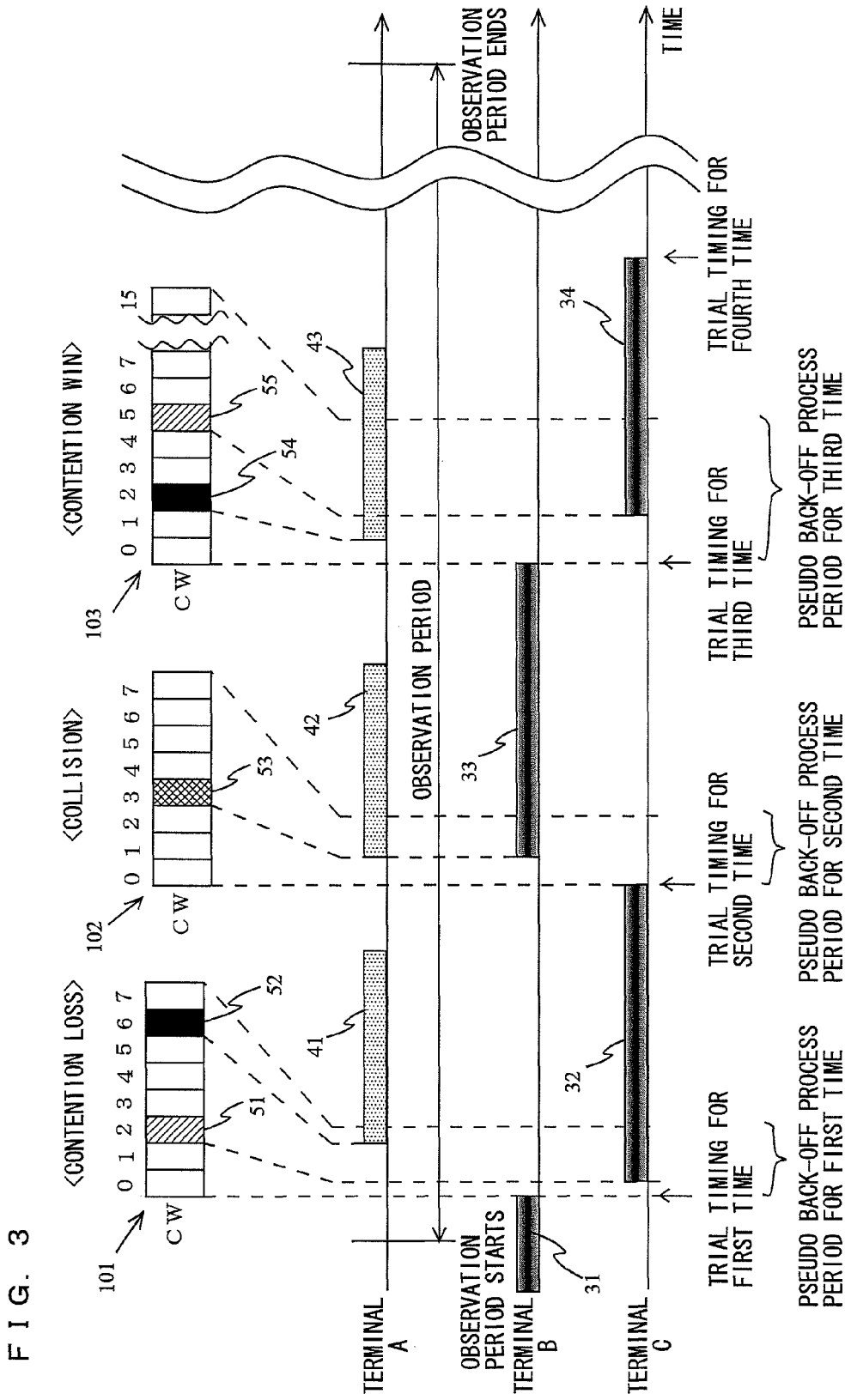
FIG. 3 is a view for explaining a pseudo back-off process.

The following will describe in detail the operation of the communication apparatus 21. FIG. 3 is a view for explaining the pseudo back-off process. In FIG. 3, for convenience of explanation, the communication apparatuses 21 which are the terminals in the communication system 1 are referred to as the terminal A, the terminal B, and the terminal C (see FIG. 1). Further, for convenience of explanation, the following description will be made focusing on the pseudo back-off process by the terminal A on the assumption that the terminal A does not transmit a transmission frame. As shown in FIG. 3, a CW when the pseudo back-off process is performed for the first time after observation of the medium occupation state starts is a CW 101, a CW when the pseudo back-off process is performed for the second time is a CW 102, and a CW when the pseudo back-off process is performed for the third time is a CW 103. Each CW is composed of a plurality of slots, and a slot number starting with 0 is assigned to each slot in order. FIG. 3 shows a case where the terminal B transmits transmission frames 31 and 33 and the terminal C transmits transmission frames 32 and 34. The terminal A performs the pseudo back-off process as transmitting, in a pseudo manner, pseudo transmission frames 41 to 43 which are not actually transmitted. Here, the lengths of the pseudo transmission frames 41 to 43 are preferably the same as that of a transmission frame which is actually transmitted by the terminal A, but not particularly limited thereto.

Figure 4:
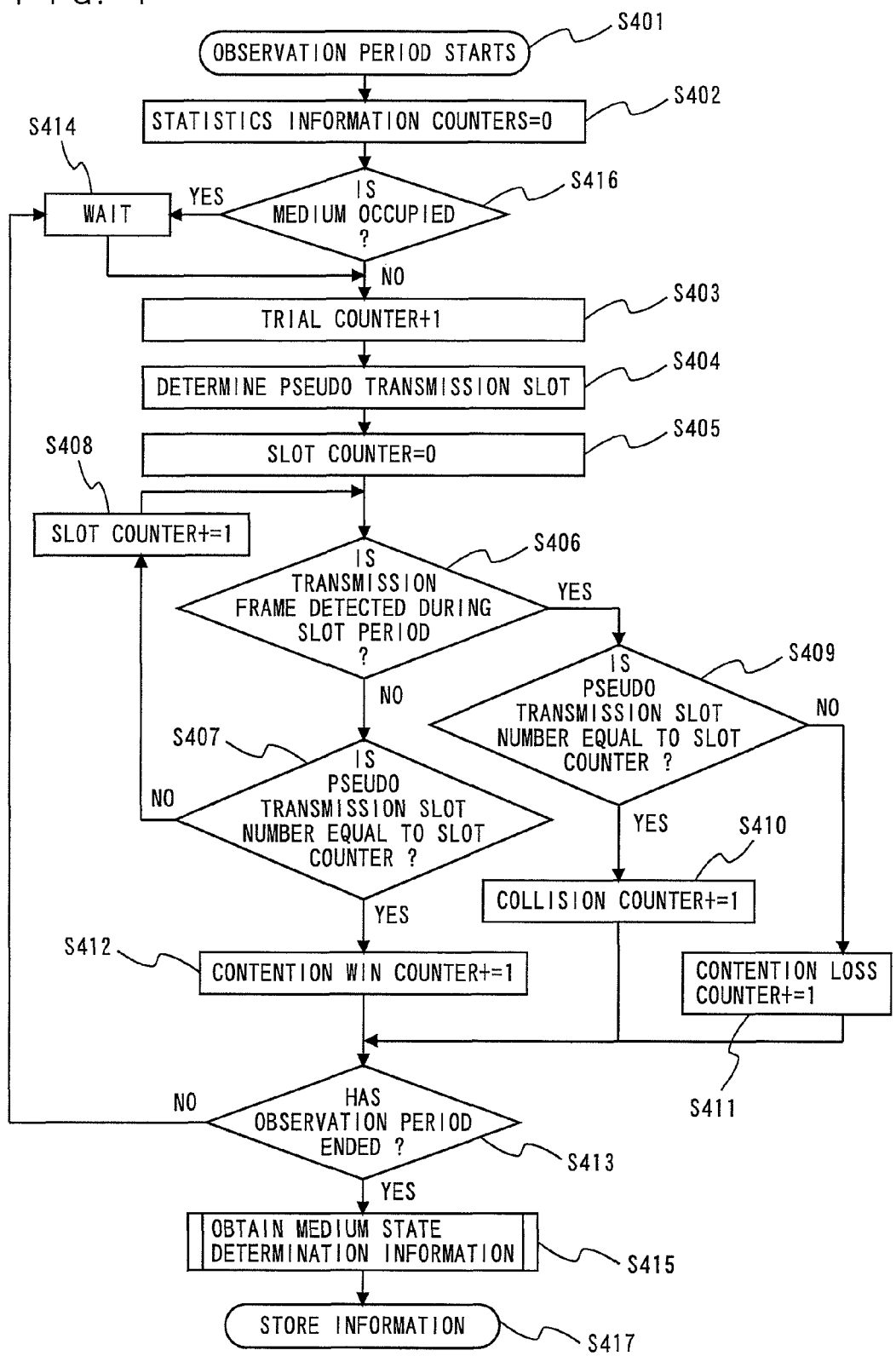
FIG. 4 is a flow chart for performing the pseudo back-off process, determining a medium occupation state, and obtaining determination information.

FIG. 4 is a flowchart for performing the pseudo back-off process, determining a medium occupation state, and obtaining determination information. The following description will be made with reference to FIGS. 2 to 4. First, when an observation period of the medium occupation state starts (a step S401), the medium information obtaining section 26 sets counts of the trial counter 61, the contention win counter 62, the collision counter 63, and the contention loss counter 64, which are medium information, to be 0 (a step S402). Next, by using information received from the reception section 24 which has a function to detect whether or not a transmission line medium (hereinafter, referred to merely as a medium) is occupied by a transmission frame, the back-off process section 25 confirms whether or not the medium is occupied by a transmission frame (a step S416). When the medium is occupied by a transmission frame, the back-off process section 25 waits until confirming the ending of the occupation (a step S414). When the medium is not occupied by a transmission frame, or when the waiting at the step S414 ends, the medium information obtaining section 26 adds 1 to the count of the trial counter which counts a number of times of trials of the pseudo back-off process (a step S403).

The following will describe an operation in the pseudo back-off process. In FIG. 3, the back-off process section 25 has confirmed the ending of occupation by transmission of the transmission frame 31 by the terminal B, and has ended the waiting (the step S414). The timing of the ending of the waiting is a trial timing of the pseudo back-off process for the first time shown in FIG. 3. The following will describe an operation in the pseudo back-off process for the first time. Subsequent to the step S403, as shown in FIG. 3, the back-off process section 25 determines, by a random number, any one of the slots in the CW101 as a pseudo transmission slot 52 for transmitting the pseudo transmission frame 41 in a pseudo manner (a step S404). In FIG. 3, number 6 is selected by the random number, the slot of the number 6 in the CW101 is determined as the pseudo transmission slot 52. Next, the back-off process section 25 sets a count of a slot counter included in the back-off process section 25 to be 0 (indicating the slot of number 0 in the CW101) (a step S405). Next, the back-off process section 25 confirms whether or not the reception section 24 detects a transmission frame transmitted by the terminal B or the terminal C during a period of the slot of the number 0 indicated by the slot counter (a step S406). In FIG. 3, because a transmission frame transmitted by the terminal B or the terminal C is not detected during the period of the slot of the number 0, the process shifts to the following step S407. Next, the back-off process section 25 compares the slot number 6 of the pseudo transmission slot 52 with the count number 0 of the slot counter (the step S407). Because the slot number 6 is not equal to the count number 0, 1 is added to the count of the slot counter (a step S408), and the process returns to the step S406. Similarly, because the process shifts from the step S406 to the step S407 and from the step S407 to the step S408, the count of the slot counter becomes 2, and the process returns to the step S406. Next, as shown in FIG. 3, the back-off process section 25 confirms that the reception section 24 detects the transmission frame 32 transmitted by the terminal C during a period of a slot 51 of number 2 indicated by the slot counter (the step S406), and thus the process shifts to a step S409. Next, the back-off process section 25 compares the slot number 6 of the pseudo transmission slot 52 with the count number 2 of the slot counter (the step S409). Because the number 6 is not equal to the count number 2, the medium information obtaining section 26 adds 1 to the count of the contention loss counter (a step S411). This is the end of the pseudo back-off process for the first time. The result of the pseudo back-off process for the first time is "contention loss".

Subsequent to the step S411, the back-off process section 25 determines whether or not the observation period of the medium occupation state has ended (a step S413). As shown in FIG. 3, because the observation period has not ended, the back-off process section 25 waits until a later time among a time of the ending of transmitting the transmission frame 32 and a time of the ending of transmitting the pseudo transmission frame 41 in a pseudo manner (the step S414). Here, as already described, the pseudo transmission frame 41 is not actually transmitted. Next, when the waiting at the step S414 ends, the process at the step S403 is performed.

The timing of the ending of the waiting is a trial timing of the pseudo back-off process for the second time shown in FIG. 3. The following will describe an operation in the pseudo back-off process for the second time. Subsequent to the above step S403, as shown in FIG. 3, the back-off process section 25 determines, by a random number, any one of the slots in the CW102 as a pseudo transmission slot 53 for transmitting the pseudo transmission frame 42 in a pseudo manner (the step S404). In FIG. 3, number 3 is selected by the random number, and the slot of the slot number 3 in the CW102 is determined as the pseudo transmission slot 53. Next, similarly as in the operation in the pseudo back-off process for the first time, subsequent to the step S405, the steps S406 to S408 are repeated. Then, as shown in FIG. 3, the back-off process section 25 confirms that the reception section 24 detects the transmission frame 33 transmitted by the terminal B during a period of the slot 53 of the slot number 3 indicated by the slot counter (the step S406), and thus the process shifts to the step S409. Next, the back-off process section 25 compares the slot number 3 of the pseudo transmission slot 53 with the count number 3 of the slot counter (the step S409). Because the slot number 3 is equal to the count number 3, the medium information obtaining section 26 adds 1 to the count of the collision counter (a step S410). This is the end of the pseudo back-off process for the second time. The result of the pseudo back-off process for the second time is "collision".

Here, as shown in FIG. 3, because the observation period has not ended, similarly as in the operation after the ending of the pseudo back-off process for the first time, the process shifts from the step S413 to the step S414 and from the step S414 to the step S403.

The timing of the ending of the waiting at the step S414 is a trial timing of the pseudo back-off process for the third time shown in FIG. 3. The following will describe an operation in the pseudo back-off process for the third time. Subsequent to the step S403, as shown in FIG. 3, the back-off process section 25 determines, by a random number, any one of the slots in the CW 103 as a pseudo transmission slot 54 for transmitting the pseudo transmission frame 43 in a pseudo manner (the step S404). Here, because the trial result of the pseudo back-off process for the second time is "collision", the number of slots composing the CW103 is increased similarly as in the regular back-off process. In other words, the CW size is increased. In FIG. 3, as an example, the slots composing the CW103 are increased to 16 slots with slot numbers of 0 to 15. In FIG. 3, number 2 is selected by the random number, and the slot of the slot number 2 in the CW103 is determined as the pseudo transmission slot 54. Next, similarly as in the operation in the pseudo back-off process for the first time, subsequent to the step S405, the steps S406 to S408 are repeated. Then, after the count of the slot counter becomes 2, the back-off process section 25 determines whether or not the slot number 2 of the pseudo transmission slot 54 is equal to the count number 2 (the step S407). Because the slot number 2 is equal to the count number 2, the medium information obtaining section 26 adds 1 to the count of the contention win counter (a step S412). This is the end of the pseudo back-off process for the third time. The result of the pseudo back-off process for the third time is "contention win".

When the observation period has not ended, the process shifts to the step S414, and the pseudo back-off process is performed for the fourth time. When the observation period has ended, the process shifts to a step S415. Here, because the trial result of the pseudo back-off process for the third time is "contention win", a CW size when the pseudo back-off process is performed for the fourth time is reset to the size of the CW101 when the pseudo back-off process is performed for the first time, similarly as in the regular back-off process.

The above has described the operation of obtaining medium information only based on the pseudo back-off process even when the terminal A performs the regular back-off process and transmits a transmission frame during the observation period. However, when the terminal A performs the regular back-off process and transmits a transmission frame during the observation period, the result of the regular back-off process (the number of contention win, the number of contention loss, the number of collision, the number of times of trials of the back-off process) may be added to each medium information obtained by the pseudo back-off process. In this case, a mechanism for detecting collision of transmission frames is additionally needed. Alternatively, there may be two types of frames (a transmission frame and a pseudo transmission frame for collecting statistical information) in the terminal A, and a regular back-off process for transmitting the transmission frame and a pseudo back-off process for collecting statistical information may be simultaneously performed. In this case, two back-off process sections 25 need to be provided in the terminal A.

Next, at the step S415, the medium state determination section 27 receives each medium information from the medium information obtaining section 26, and determines the medium occupation state using each medium information to obtain determination information. For example, the count values of the contention win counter 62, the collision counter 63, the contention loss counter 64, and the trial counter 61 may be determination information without change. Alternatively, for example, a collision probability obtained by dividing the count value of the collision counter 63 by the count value of the trial counter 61, a contention success probability obtained by dividing the count value of the contention win counter 62 by the count value of the trial counter 61, a contention failure probability obtained by dividing the count value of the contention loss counter 64 by the count value of the trial counter 61 may be obtained to be determination information. Here, under the condition that contention control is perfectly and equally performed for all the terminals, a chance of transmitting a transmission frame is equally provided to all the terminals. Thus, a probability (contention success probability) for each terminal to transmit a transmission frame becomes the reciprocal of the number of terminals. For this reason, under the condition that the traffic of each terminal is equal to those of the other terminals, the contention success probability becomes the reciprocal of the number of terminals which try to transmit a transmission frame during the observation period. As a result, the contention success probability which is determination information can be a parameter for determining the real-time number of terminals in operation.

As described above, the medium state determination section 27 receives the medium information from the medium information obtaining section 26, obtains the determination information, such as the above contention success probability, according to need (the step S415), and notifies the information storage section 28 of the determination information. Next, the information storage section 28 stores the notified determination information therein (a step S417).

The following will describe specifically how to obtain what determination information and further how to use the determination information at the step S415.

First Application Example of the First Embodiment of the Present Invention

A first application example will describe a method for improving the throughput of the whole communication system 1 (see FIG. 1) while maintaining equality of a transmission chance among each terminal by appropriately changing the size of a CW used in the regular back-off process for transmitting a transmission frame.

Here, it is proved by the simulation result in the Patent Document 1 that when a CW size is set to be the number of terminals in operation at that time, the throughput of the whole communication system becomes the maximum. Thus, it is understood that the throughput of the whole communication system can be maximized by sequentially and appropriately changing a CW size in accordance with the number of terminals in operation.

Further, generally, in a contention distributed control system, it is difficult to sequentially know the number of terminals in operation. However, as already described, by using the contention success probability or the contention failure probability, the number of terminals in operation or a value indicative of a traffic corresponding to the number of terminals can be known, and further, the medium occupation state can be known. Thus, when the contention success probability is high, because the number of communication apparatuses which try to transmit a transmission frame is small (the number of terminals in operation is small), the throughput of the whole communication system is improved by setting the CW size to be small when performing the regular back-off process. On the other hand, when the contention success probability is low, because the number of communication apparatuses which try to transmit a transmission frame is large (the number of terminals in operation is large), a collision probability of the transmission frame is reduced by setting the CW size to be large when performing the regular back-off process, thereby improving the throughput of the whole communication system.

Figures 5, 6:
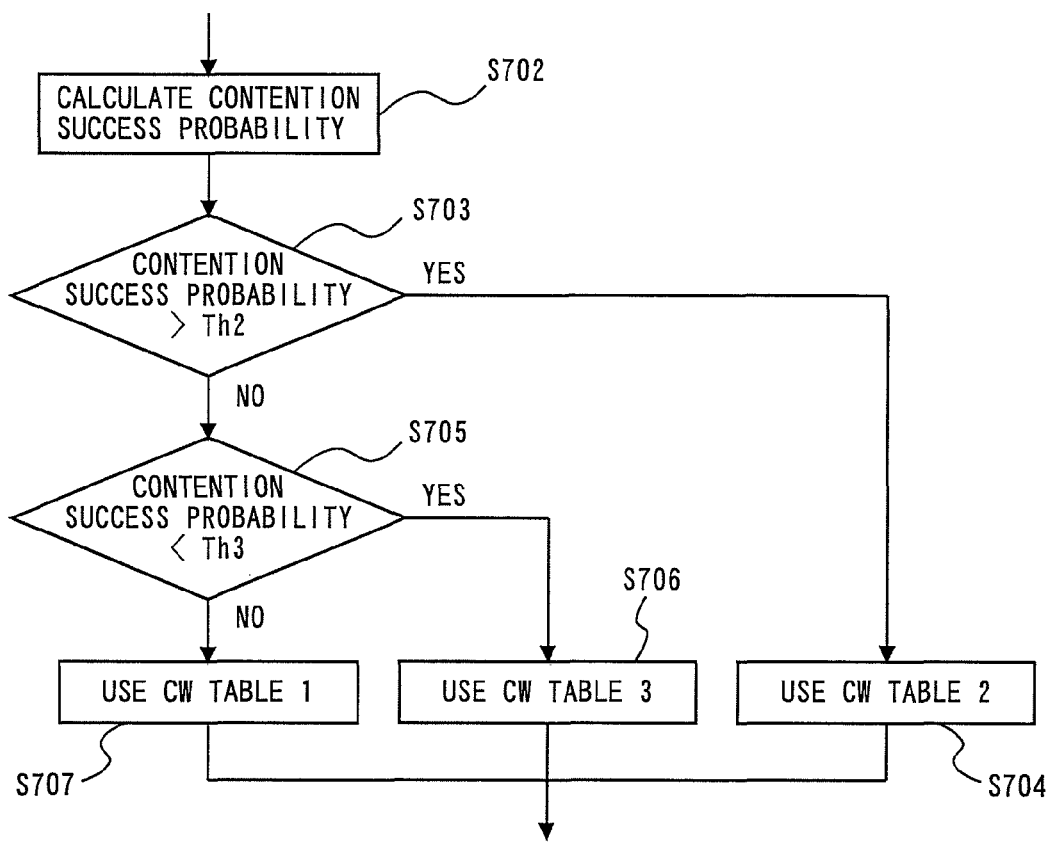
FIG. 5 is a view showing CW tables 1 to 3 included in a back-off process section 25.
FIG. 6 is a flow chart for a medium state determination section 27 to obtain, at a step S415, determination information for determining a CW table used by the back-off process section 25.

The following will describe specifically a method for sequentially and appropriately changing the CW size in accordance with the number of terminals in operation. FIG. 5 is a view showing CW tables 1 to 3 included in the back-off process section 25. The CW table 1 is, as an example, a CW table which is used in a system which determines a CW size at initial transmission according to a conventional binary random back-off algorithm and increases the CW size when collision is detected. Further, the CW table 1 means that every time retransmission of the transmission frame occurs due to collision when transmission of a transmission frame is tried using a CW (there are 8 slots in the CW; see FIG. 3) in which the maximum value for the slot number is 7 at initial transmission, the maximum number for the slot number in the CW is increased to 15, 31, 63 . . . to increase the CW size. It is noted that although the description is made using the tables for convenience's sake, the back-off process section 25 does not need to have the tables, and may have calculation formulas. The back-off process section 25 may have only one maximum value for the slot number in the CW, which is calculated with a calculation formula using a number of times of retransmission. For example, in the conventional IEEE802.11, the maximum value for the slot number in the CW is determined as $(CWmin+1) \times 2^I - 1$. CWmin denotes the maximum value for the slot number in the CW at initial transmission, and I ($I \geq 0$) denotes a number of times of retransmission. The values for the CW size in the CW table 2 are set to be smaller values than those in the CW table 1, and the values for the CW size in the CW table 3 are set to be larger values than those in the CW table 1.

FIG. 6 is a flowchart for the medium state determination section 27 to obtain, at the step S415, determination information for determining a CW table used by the back-off process section 25. When the ending of the observation period is confirmed at the step S413 shown in FIG. 4, the medium state determination section 27 calculates a contention success probability by dividing the count value of the contention win counter 62 by the count value of the trial counter 61 (a step S702). Next, the medium state determination section 27 compares a contention success probability threshold Th2 specific to the communication system 1 with the contention success probability calculated at the step S702, and when the contention success probability is larger than the contention success probability threshold Th2, the medium state determination section 27 determines that the number of terminals currently in operation is small, and the process shifts to a step S704 (a step S703). In this case, the medium state determination section 27 obtains determination information which causes the CW table used by the back-off process section 25 for the regular back-off process and the pseudo back-off process to be the CW table 2 in FIG. 5 (the step S704). On the other hand, when the contention success probability is smaller than the contention success probability threshold Th2 as the result of the comparison between the contention success probability threshold Th2 specific to the communication system 1 and the contention success probability calculated at the step S702 by the medium state determination section 27, the process shifts to a step S705 (the step S703). In this case, the medium state determination section 27 compares a contention success probability threshold Th3 specific to the communication system 1 (Th3<Th2) with the contention success probability calculated at the step S702, and when the contention success probability calculated at the step S702 is smaller than the contention success probability threshold Th3, the medium state determination section 27 determines that the number of terminals currently in operation is large, and the process shifts to a step S706 (the step S705). In this case, the medium state determination section 27 obtains determination information which causes the CW table used by the back-off process section 25 for the regular back-off process and the pseudo back-off process to be the CW table 3 in FIG. 5 (the step S706). On the other hand, when the contention success probability calculated at the step S702 is larger than the contention success probability threshold Th3 as the result of the comparison between the contention success probability threshold Th3 specific to the communication system 1 and the contention success probability calculated at the step S702 by the medium state determination section 27, the process shifts to a step S707 (the step S705). In this case, the medium state determination section 27 obtains determination information which causes the CW table used by the back-off process section 25 for the regular back-off process and the pseudo back-off process to be the CW table 1 in FIG. 5 (the step S707). As described above, the medium state determination section 27 obtains the determination information for determining the CW table used by the back-off process section 25 (the step S415 in FIG. 4), and notifies the information storage section 28 of the determination information.

Next, the information storage section 28 stores therein the determination information, obtained at the step S415, for determining the CW table used by the back-off process section 25 (the step S417). At the same time, the information storage section 28 notifies the back-off process section 25 of the determination information. Next, in accordance with the determination information, the back-off process section 25 uses any one of the CW tables 1 to 3 (see FIG. 5) included in advance therein for the regular back-off process and the pseudo back-off process. It is noted that the communication apparatus 21 may not include the information storage section 28, and the medium state determination section 27 may directly notify the back-off process section 25 of the determination information.

As described above, when determining that the observation period has ended (the step S413), each terminal (each communication apparatus 21) in the communication system 1 determines the CW table used by the back-off process section 25. When the regular back-off process is performed, this determined CW table is used. Further, each terminal also uses this determined CW table when performing the pseudo back-off process during the next observation period. Here, the length of the observation period of each terminal is equal to those of the other terminals, and sufficiently large to such a degree that a contention success probability obtained by the terminal can be considered equal to those by the other terminals. Thus, each terminal calculates the same contention success probability, and determines and uses a CW table in accordance with the contention success probability. As a result, each terminal uses a CW table having the same content.

Here, as shown in FIG. 5, the values for the CW size in the CW table 3 are set to be larger values than those in the CW table 1. Thus, when each terminal uses the CW table 3 for the regular back-off process (when a medium occupation rate is high and a contention success probability is low), the number of times of retransmitting a transmission frame due to collision decreases, and hence the number of terminals which repeat a retransmission process decreases. As a result, equality of a transmission chance is improved between a terminal which repeats the retransmission process and a terminal which newly tries transmission. Further, the values for the CW size in the CW table 2 are set to be smaller values than those in the CW table 1. Thus, when each terminal uses the CW table 2 for the regular back-off process (when a medium occupation rate is low and a contention success probability is high), an idle state period of the medium which occurs by the back-off process (a period when the transmission line medium cannot be effectively used which increases as the CW size increases) is reduced, thereby improving the throughput of the whole communication system 1. In FIG. 5, with the binary back-off algorithm as an example, the CW size is increased at retransmission. However, because this change of the CW size impairs equality of a transmission chance as described above, each table may have only a single value for the CW size for not changing the CW size even at retransmission.

As described above, each communication apparatus 21 determines the transmission line state, and appropriately selects a CW table in an autonomous distributed manner. As a result, a plurality of the communication apparatuses 21 are applicable to a system which does not include a central control terminal such as an access point, and can improve the throughput of the whole communication system while easily observing the medium occupation state and performing the contention distributed control which provides equality of a transmission chance.

Second Application Example of the First Embodiment of the Present Invention

Figures 7, 8:
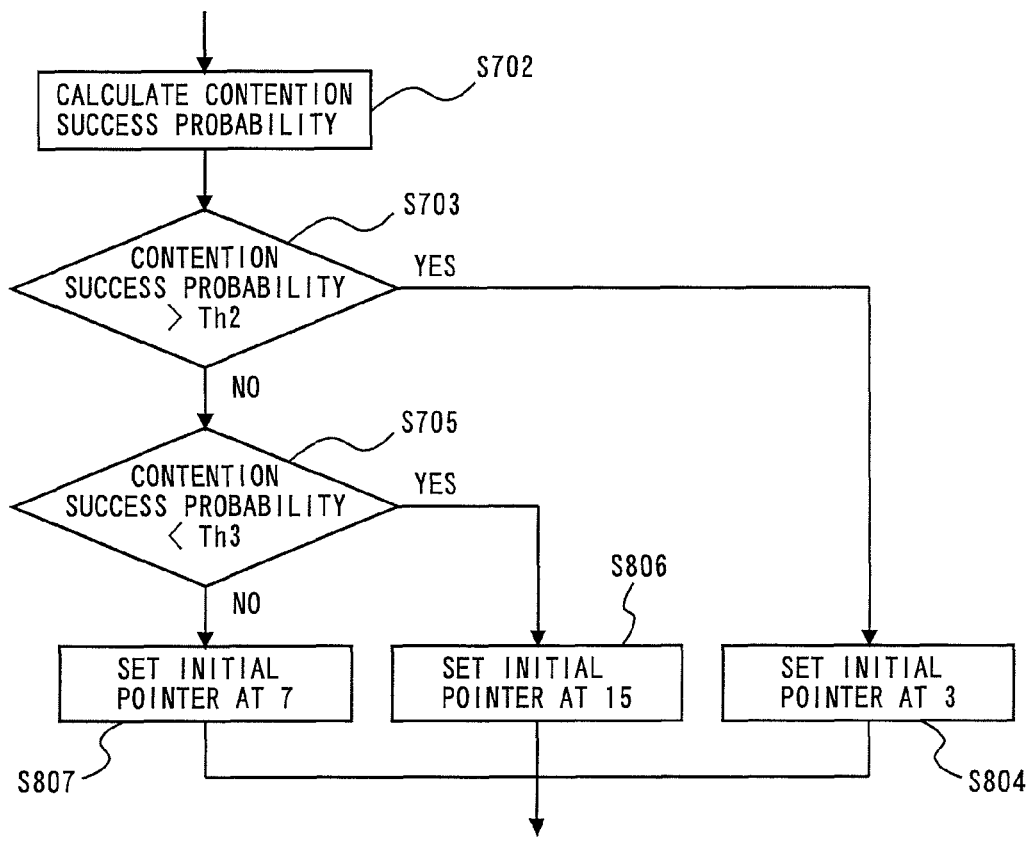
FIG. 7 is a view showing a CW table 4 which is an example of a CW table included in the back-off process section 25.
FIG. 8 is a flow chart for the medium state determination section 27 to obtain, at the step S415, determination information for determining an initial value pointer setting value in the CW table 4.

While the first application example has described a method for appropriately using a plurality of CW tables (or calculation formulas), a second application example will describe an example of a method for obtaining the same effect as the first application example, using one CW table. FIG. 7 is a view showing a CW table 4 which is an example of a CW table included in the back-off process section 25. FIG. 8 is a flow chart for the medium state determination section 27 to obtain, at the step S415 (see FIG. 4), determination information for determining an initial value pointer setting value in the CW table 4. In the flow chart shown in FIG. 8, the steps S704, S706, and S707 in the flow chart shown in FIG. 6 explained in the first application example are replaced with steps S804, S806, and S807. Hereinafter, the same steps as those explained with FIG. 6 are indicated by the same reference characters, and the description thereof will be omitted. In addition, in the CW table, the initial value pointer setting value indicates a minimum value for the CW size used for the regular back-off process and the pseudo back-off process. For example, in FIG. 5 explained in the first application example, the initial value pointer setting value in the CW table 1 is 7, the initial value pointer setting value in the CW table 2 is 3, and the initial value pointer setting value in the CW table 3 is 15.

At the step S804 shown in FIG. 8, the medium state determination section 27 obtains determination information which determines the initial value pointer setting value in the CW table 4 used by the back-off process section 25 for the regular back-off process and the pseudo back-off process to be 3. Further, similarly, at the step S806, the medium state determination section 27 obtains determination information which determines the initial value pointer setting value in the CW table 4 to be 15. Further, similarly, at the step S807, the medium state determination section 27 obtains determination information which determines the initial value pointer setting value in the CW table 4 to be 7. As described above, at the step S415 in FIG. 4, the medium state determination section 27 obtains the determination information, and notifies the information storage section 28 of the determination information.

Next, the information storage section 28 stores therein the determination information which is obtained at the step S415 and determines the initial value pointer setting value in the CW table 4 (the step S417). At the same time, the information storage section 28 notifies the back-off process section 25 of the determination information. Next, in accordance with the determination information, the back-off process section 25 sets an initial value pointer in the CW table 4 included in advance therein, and performs the regular back-off process and the pseudo back-off process.

As described above, the same effect as in the case of using a plurality of CW tables (or calculation formulas) (see FIG. 5 explained in the first application example) can be obtained by each communication apparatus 21 changing appropriately the initial value pointer setting value in accordance with the contention success probability, using one CW table. It is noted that instead of the CW table, a calculation formula may be used. For example, when a calculation formula for the CW size of the aforementioned IEEE802.11 is used, the same effect as in the case of using a plurality of CW tables (or calculation formulas) (see FIG. 5) can be obtained using the one calculation formula by changing the value of CWmin in accordance with the contention success probability.

The first and second application examples has described the case where the two thresholds Th2 and Th3 are obtained and the three CW tables or the three initial value pointer setting values are used (see FIGS. 5 to 8). However, the number of thresholds, the number of CW tables, and the number of initial value pointer setting values are not limited to the above numbers. Further, the values for the thresholds and the values for the CW size in the CW tables for each communication apparatus need to be respectively the same as those for the other communication apparatuses in the same communication system as values specific to the communication system, but there is no limitation on these values. Further, a specific communication apparatus (e.g. a master station in a central control system) can perform the operations explained with FIGS. 4, 6, and 8 to obtain determination information, and can notify each terminal of the determination information using a dedicated frame or a beacon frame including time management information and the like. In this case, the above pseudo back-off process only has to be performed just by the specific communication apparatus, thereby reducing a load on each terminal.

Third Application Example of the First Embodiment of the Present Invention

A third application example will describe a method for improving reliability of calculating a transmission line change, using the aforementioned collision probability (determination information) obtained by dividing the count value of the collision counter 63 by the count value of the trial counter 61.

First, calculation of a transmission line change will be described. For example, in a power line communication system using an existing electric power line as a communication medium (transmission line), a transmission line state is changed by operation states, ON/OFF of the powers, and plug-in/out, of electric household appliances and the like. In a communication system, such as a wireless LAN device and a power line communication system, whose transmission frame is composed of a header part and a data part of which a transmission speed is changed in accordance with the transmission line state, a change of the transmission line state needs to be quickly calculated for changing the transmission speed of the transmission frame.

As a method for calculating a change of the transmission line state, for example, there is a method in which an occurrence rate of retransmission (the number of retransmitted frames/the number of transmitted frames) is monitored during a constant period on a transmitting side, and a change of the transmission line state is calculated using a change amount of the occurrence rate of retransmission. In addition, there is a method in which an SNR (Signal to Noise Ratio) of a received frame is obtained on a receiving side, and a change of the transmission line state is calculated using a change amount of the SNR.

As a system using the method for calculating a change of the transmission line using a change amount of the occurrence rate of retransmission, for example, there is a system in which an ACK frame and a NACK frame which are indicative of whether or not a transmission frame is received is transmitted back from a receiving side to the transmitting side. In this system, even when collision of transmission frames occurs, the header parts of the transmission frames may be received on the receiving side due to a supplementary effect. The transmission frames which collide against each other interfere with each other, and thus a noise component increases apparently. When noise resistance of the data part is vulnerable due to an increase in a transmission speed, error occurs in the data part, and the receiving side transmits an NACK frame indicative of that effect to the transmitting side. The transmitting side which has received the NACK frame retransmits the transmission frame, and hence the occurrence rate of retransmission rises. Thus, the occurrence rate of retransmission changes not only by a change of the transmission line state but also by collision of transmission frames. Particularly, in a transmission line state where the medium occupation rate is high, collision of transmission frames occurs frequently, and hence the occurrence rate of transmission changes (rises) considerably.

Similarly, even in a system using the method for calculating a change of the transmission line state using a change amount of the SNR, the noise component of a transmission frame increases apparently by collision. Thus, the SNR changes not only by a change of the transmission line state but also by collision of transmission frames. Particularly, in a transmission line state where the medium occupation rate is high, collision of transmission frames occurs frequently, and hence the SNR changes considerably.

As described above, the change of the occurrence rate of retransmission and the change of the SNR depend not only on a change of the transmission line state but also on collision of transmission frames. Thus, if the change of the occurrence rate of retransmission or the change of the SNR is regarded as a change of the transmission line state, the reliability of calculating a transmission line change becomes low because the effect by the above collision is not taken into account.

Here, in a system in which an ACK frame and a NACK frame which are indicative of whether or not a transmission frame is received is transmitted back from a receiving side to a transmitting side, generally, it is difficult for the transmitting side to specifically determine whether the cause of receiving the NACK frame results from collision of transmission frames or from a change of the transmission line state. This is because the NACK frame does not contain information indicative of the cause of transmitting the NACK frame. Similarly, in a system using the method for calculating a change of the transmission line state using a change amount of the SNR, generally, it is difficult for a transmitting side to specifically determine whether the cause of a change in the SNR of a transmission frame results from collision of transmission frames or from a change of the transmission line state.

However, the communication apparatus 21 according to the third application example can improve reliability of calculating a transmission line change, using the collision probability obtained by dividing the count value of the collision counter 63 by the count value of the trial counter 61. As described above, this collision probability is the determination information obtained by the medium state determination section 27 (see FIG. 2) at the step S415 (see FIG. 4).

The following will describe, as an example, a case where the communication apparatus 21 is applied to a system in which an ACK frame and a NACK frame which are indicative of whether or not a transmission frame is received is transmitted back from a receiving side to a transmitting side. The communication apparatus 21 which is the transmitting side can obtain an occurrence rate of retransmission which is attributable to a change of the transmission line state, by multiplying an occurrence rate of retransmission which is attributable to the transmission line state and an occurrence rate of collision by (1-collision probability) Thus, the communication apparatus 21 can obtain a change amount of the occurrence rate of retransmission which is attributable to a change of the transmission line state, thereby improving reliability of calculating a transmission line change. Here, because the collision probability is obtained by taking into account the effect by the communication apparatuses in operation when a transmission line change is calculated, the collision probability is reliable as a parameter used for calculating a transmission line change.

It is noted that the length of an observation period for obtaining an occurrence rate of retransmission which is attributable to the transmission line state and the occurrence rate of collision and the length of an observation period for obtaining a collision probability (the observation period, shown in FIG. 3, for performing the pseudo back-off process) do not need to be equal to each other. Further, because a time period from the start to the end of calculating a transmission line change is affected by the lengths of these two observation periods, the lengths of these two observation periods are preferably determined according to need. Further, although each medium information is obtained based on the pseudo back-off process in the above description, when the communication apparatus 21 is used for calculating a transmission line change, it is possible to obtain each medium information only based on the regular back-off process which is performed only at transmission of a transmission frame.

Second Embodiment

Figure 9:
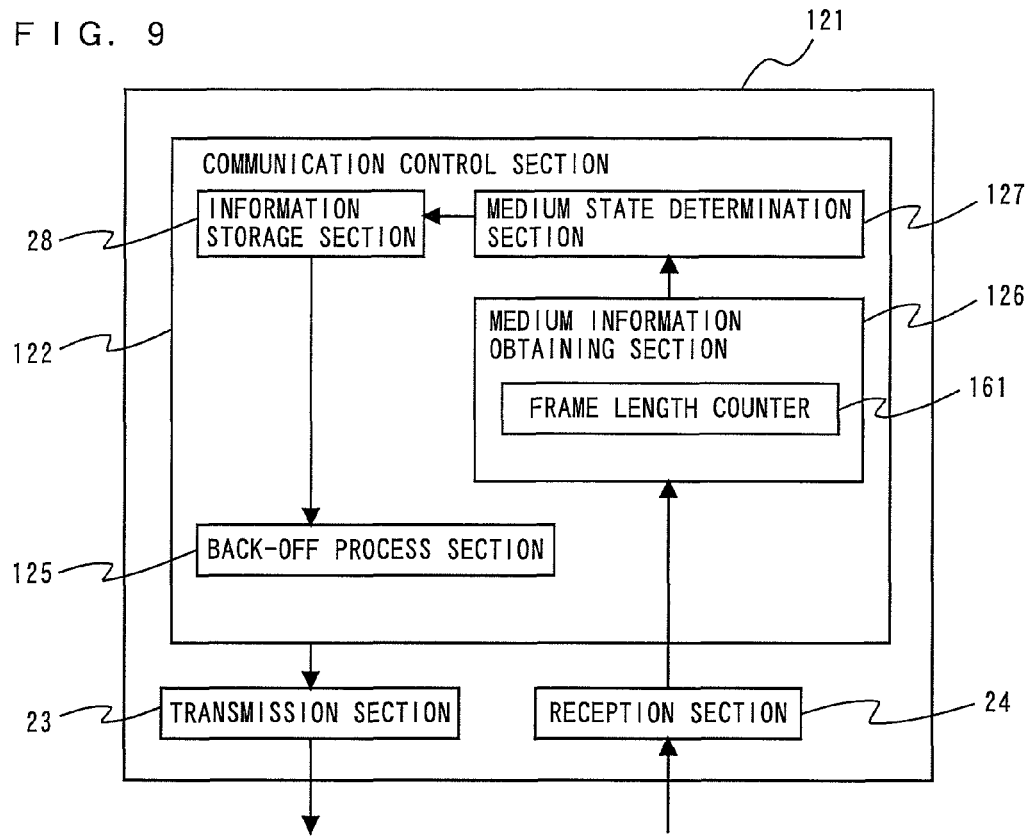
FIG. 9 is a view showing an exemplary configuration of a communication apparatus 121 according to a second embodiment of the present invention.

FIG. 9 is a view showing an exemplary configuration of a communication apparatus 121 according to a second embodiment of the present invention. As shown in FIG. 9, the communication apparatus 121 includes a transmission section 23, a reception section 24, and a communication control section 122 for performing general communication control such as determination of a transmission timing based on CSMA/CA and a frame identification process. The communication control section 122 includes a back-off process section 125, a medium information obtaining section 126, a medium state determination section 127, and an information storage section 28. The medium information obtaining section 126 includes a frame length counter 161. The transmission section 23, the reception section 24, and the information storage section 28 are the same as those of the communication apparatus 21 in the first embodiment, and thus the same reference characters are assigned thereto. Although the back-off process section 125, the medium information obtaining section 126, the medium state determination section 127, and the information storage section 28 are separated from each other for convenience of explanation, they may be combined into a single configuration if the single configuration has the same function.

The following will describe briefly the characteristics of the communication apparatus 121 prior to detailed description about an operation of the communication apparatus 121. The communication apparatus 121 differs from the communication apparatus 21 according to the first embodiment in not performing a pseudo back-off process. The communication apparatus 121 has a characteristic of determining a medium occupation state by directly observing the length (hereinafter, referred to as frame length) of a frame being transmitted through a medium, not determining a medium occupation state by performing the pseudo back-off process.

Figure 10:
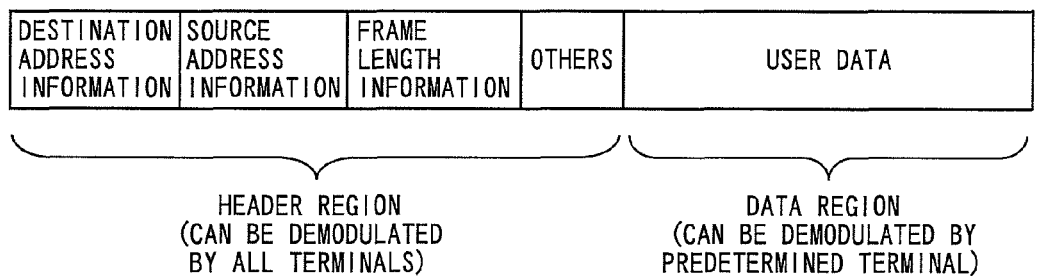
FIG. 10 is a view showing an exemplary configuration of a frame being transmitted through a medium.

FIG. 10 is a view showing an exemplary configuration of a frame being transmitted through the medium. As shown in FIG. 10, the frame is composed of a header region which can be demodulated by all terminals in a communication system and a user data region which can be demodulated only by a terminal which is the destination of the frame. The header region includes address information of the destination terminal, address information of the source terminal, and frame length information. Here, the frame length information indicates a period for the frame to occupy the medium at transmission of the frame, and is, for example, the number of OFDM symbols (a symbol time is a fixed time). Further, the frame length information may be values for a data amount and a transmission rate for calculating information indicative of the period for the frame to occupy the medium.

Figure 11:
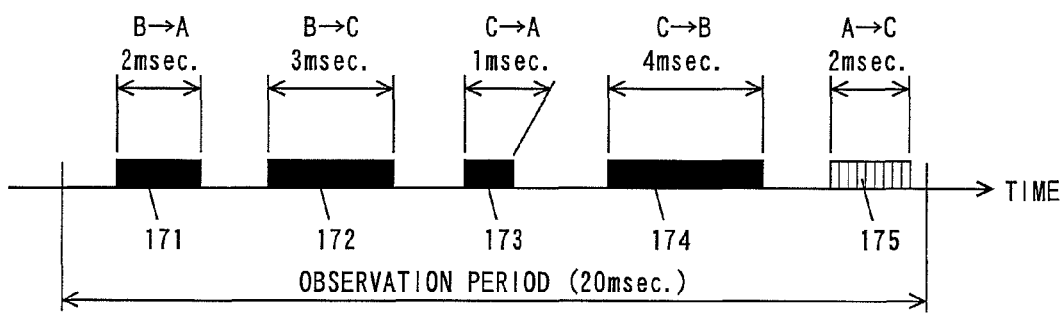
FIG. 11 is a view for explaining observation of a medium occupation state.

FIG. 11 is a view for explaining observation of a medium state by the communication apparatus 121. FIG. 11 shows, as an example, a medium state during an observation period in a communication system which contains terminals A, B, and C each of which is the communication apparatus 121. The following description will be made focusing on observation of a medium occupation state by the terminal A. As shown in FIG. 11, during the observation period (e.g. 20 msec), a frame 171 (its frame length: 2 msec) transmitted from the terminal B to the terminal A, a frame 172 (its frame length: 3 msec) transmitted from the terminal B to the terminal C, a frame 173 (its frame length: 1 msec) transmitted from the terminal C to the terminal A, a frame 174 (its frame length: 4 msec) transmitted from the terminal C to the terminal B, and a frame 175 (its frame length: 2 msec) transmitted from the terminal A to the terminal C are transmitted through the medium. In this case, the terminal A sums up the frame lengths of all the frames transmitted during the observation period except the frame 175 transmitted by the terminal A. Then, the terminal A calculates a rate of the sum of these frame lengths in the observation period. Specifically, the terminal A performs calculation of (2 msec+3 msec+1 msec+4 msec)/20 msec=0.5 to obtain a medium occupation rate of 50%.

Figure 12:
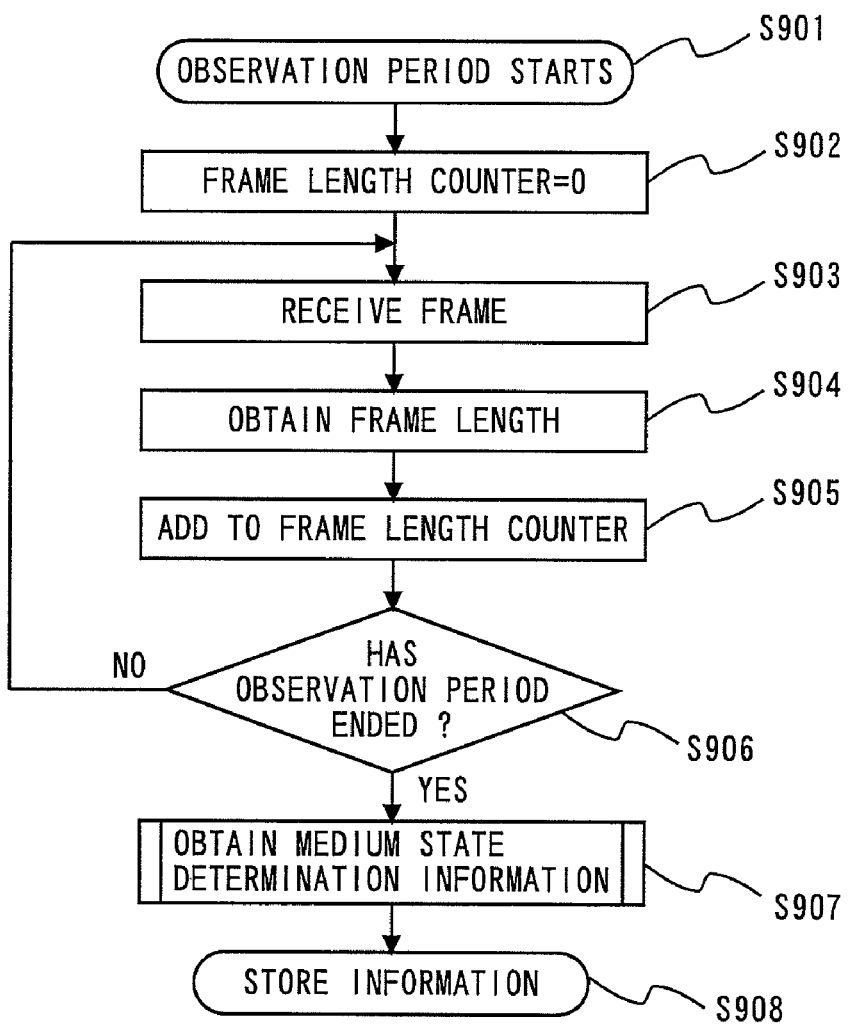
FIG. 12 is a flow chart for the communication apparatus 121 to observe a medium occupation state and obtain determination information.

FIG. 12 is a flow chart for the communication apparatus 121 to observe the medium occupation state and obtain determination information. The following will describe in detail an operation of the communication apparatus 121 with reference to FIGS. 9 to 12. When the observation period starts (a step S901), the medium information obtaining section 126 (see FIG. 9) sets a value of frame length counter 161 to be 0 (a step S902). Next, the reception section 24 receives the frame 171 (see FIG. 11) (a step S903), demodulates and obtains the frame length information of the header region shown in FIG. 10 (a step S904), and notifies the medium information obtaining section 126 of the obtained frame length information. The medium information obtaining section 126 adds 2 msec (see FIG. 11) which is the notified frame length information of the frame 171 to the frame length counter 161 (a step S905). Next, the medium information obtaining section 126 determines whether or not the observation period has ended (a step S906). Because the observation period has not ended, the process returns to the step S903. Then, similarly, the communication apparatus 121 repeats the steps S903 to S906, and 3 msec which is the frame length of the frame 172, 1 msec which is the frame length of the frame 173, and 4 msec which is the frame length of the frame 174 are added to the frame length counter 161, causing the count of the frame length counter 161 to be 10 msec. Here, because the frame 175 is a frame transmitted by the terminal A, the medium information obtaining section 126 does not add the frame length of the frame 175 to the count of the frame length counter 161. Next, the medium information obtaining section 126 determines that the observation period has ended (the step S906), and notifies the medium state determination section 127 of the count value, 10 msec, of the frame length counter 161. The medium state determination section 127 obtains later-described determination information from a medium occupation rate of 0.5 (50%) obtained by dividing the notified 10 msec by the observation period, 20 msec (a step S907).

Figure 13:
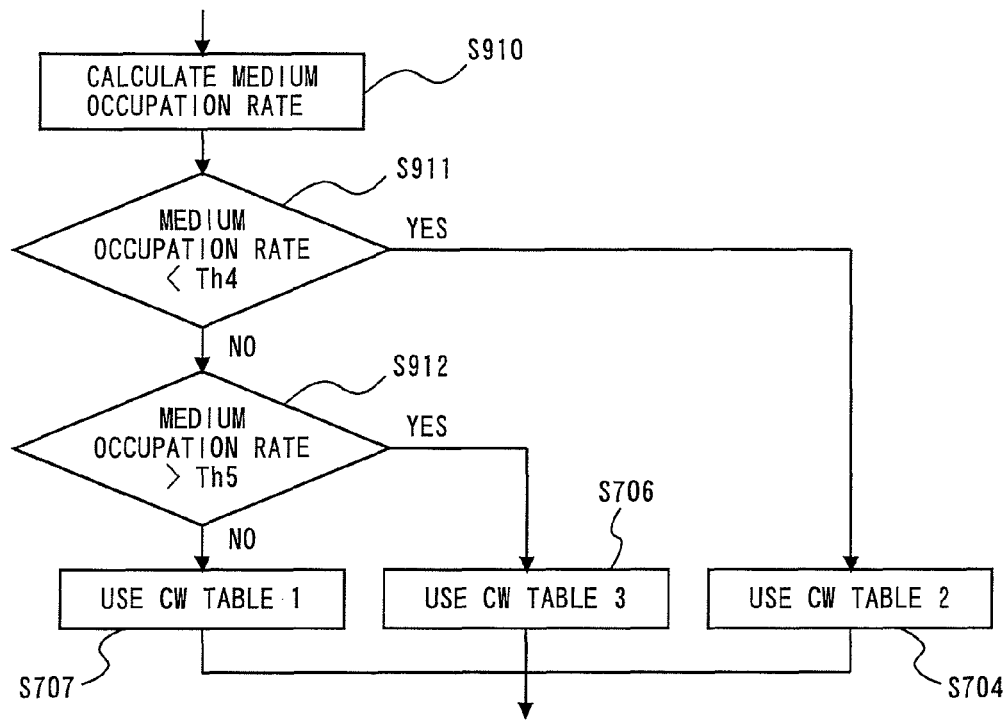
FIG. 13 is a flow chart for a medium state determination section 127 to obtain, at a step S907 in FIG. 12, determination information for determining a CW table used by a back-off process section 125.

FIG. 13 is a flow chart for the medium state determination section 127 to obtain, at the step S907 in FIG. 12, determination information for determining a CW table used by the back-off process section 125. In the flow chart in FIG. 13, the steps S702, S703, and S705 in the flow chart shown in FIG. 6 explained in the first embodiment are replaced with steps S910, S911, and S912, respectively. In the flow chart in FIG. 13, the same steps as those in the flow chart in FIG. 6 are indicated by the same reference characters.

When the ending of the observation period is confirmed at the step S906 shown in FIG. 12, the medium state determination section 127 calculates a medium occupation rate of 0.5 (50%) by dividing the count value, 10 msec, of the frame length counter 161 by the observation period, 20 msec (the step S910). Next, the medium state determination section 127 compares a predetermined medium occupation rate threshold Th4 with the medium occupation rate of 0.5 calculated at the step S910, and when the medium occupation rate of 0.5 is smaller than the medium occupation rate threshold Th4, the medium state determination section 127 determines that the medium occupation rate is small, and the process shifts to a step S704 (the step S911). In this case, the medium state determination section 127 obtains determination information which causes a CW table used by the back-off process section 125 for the regular back-off process to be the CW table 2 in FIG. 5 explained in the first embodiment (the step S704). On the other hand, when the medium occupation rate of 0.5 is larger than the medium occupation rate threshold Th4 as the result of the comparison between the medium occupation rate threshold Th4 and the medium occupation rate of 0.5 by the medium state determination section 127, the process shifts to the step S912 (the step S911). In this case, the medium state determination section 127 compares a predetermined medium occupation rate threshold Th5 (Th4<Th5) with the medium occupation rate of 0.5, and when the medium occupation rate of 0.5 is larger than the medium occupation rate threshold Th5, the medium state determination section 127 determines that the medium occupation rate is large, and the process shifts to a step S706 (the step S912). In this case, the medium state determination section 127 obtains determination information which causes the CW table used by the back-off process section 125 for the regular back-off process to be the CW table 3 in FIG. 5 (the step S706). On the other hand, when the medium occupation rate of 0.5 is smaller than the medium occupation rate threshold Th5 as the result of the comparison between the medium occupation rate threshold Th5 and the medium occupation rate of 0.5 by the medium state determination section 127, the process shifts to a step S707 (the step S912). In this case, the medium state determination section 127 obtains determination information which causes the CW table used by the back-off process section 125 for the regular back-off process to be the CW table 1 in FIG. 5 (the step S707). As described above, the medium state determination section 127 obtains the determination information for determining the CW table used by the back-off process section 125 (the step S907 in FIG. 12), and notifies the information storage section 28 of the determination information.

Next, the information storage section 28 stores therein the determination information obtained at the step S907 (a step S908 in FIG. 12). At the same time, the information storage section 28 notifies the back-off process section 125 of the determination information. Next, in accordance with the determination information, the back-off process section 125 uses any one of the CW tables 1 to 3 (see FIG. 5) included in advance therein for the regular back-off process. It is noted that the communication apparatus 121 may not include the information storage section 28, and the medium state determination section 27 may directly notify the back-off process section 125 of the determination information.

As described above, when determining that the observation period has ended (the step S906), each terminal (each communication apparatus 121) in the communication system determines the CW table used by the back-off process section 125 when performing the regular back-off process.

Here, as described above, each terminal (each communication apparatus 121) does not add the frame length of a frame (see the frame 175 in FIG. 11) transmitted by the terminal to the count of the frame length counter 161. Thus, a terminal which transmits a frame considerably occupying the medium uses a CW table having smaller CW size values than other terminals. Specifically, a terminal which transmits a large amount of data during an observation period determines that the medium occupation rate is small, and uses, for example, the CW table 2 in FIG. 5. On the other hand, a terminal which does not transmit data or transmits a small amount of data during an observation period determines that the medium occupation rate is large, and uses, for example, the CW table 3 in FIG. 5. In other words, a transmission chance for the terminal which transmits a large amount of data increases, while a transmission chance for the terminal which does not transmit data or transmits a small amount of data decreases. As a result, the terminal which transmits a large amount of data can preferentially transmit data.

Here, each CW table shown in FIG. 5 has the characteristics as described in the first embodiment. Thus, according to the second embodiment, while equality of a transmission chance is improved among each terminal, a transmission chance for a terminal which transmits a large amount of data can be exceptionally increased. As a result, according to the second embodiment, the throughput of the whole communication system can be improved. Further, the communication apparatus 121 according to the second embodiment appropriately selects a CW table in an autonomous distributed manner by observing directly frame lengths in the medium and determining the transmission line state. As a result, because the communication apparatus 121 does not perform the pseudo back-off process unlike the communication apparatus 21 according to the first embodiment, the communication apparatus 121 can significantly reduce internal processing, and can have a simple configuration.

Figure 14:
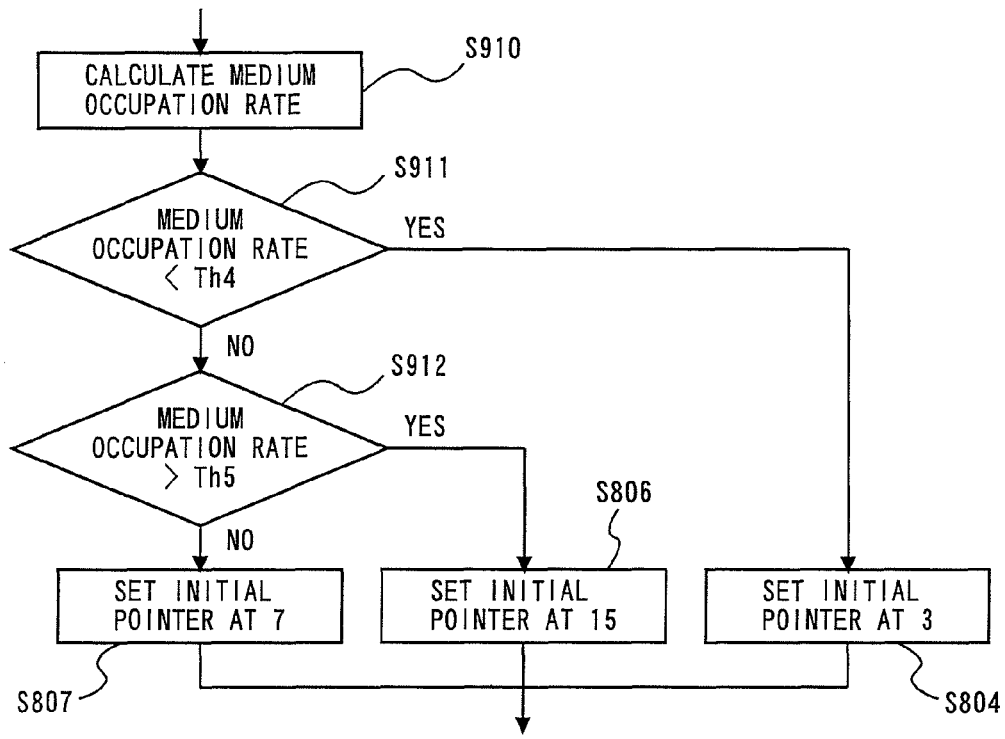
FIG. 14 is a flow chart for obtaining determination information when the CW table 4 shown in FIG. 7 is used.

As described in the second application example of the first embodiment, instead of a plurality of CW tables (or calculation formulas), one CW table may be used (see FIGS. 7 and 8). FIG. 14 is a flow chart for obtaining determination information when the CW table 4 shown in FIG. 7 is used. In the flow chart in FIG. 14, the steps S707, S706, and S704 in the flow chart in FIG. 13 are replaced with steps S807, S806, and S804, respectively. Here, the steps S807, S806, and S804 are the same as those explained with FIGS. 7 and 8 in the second application example of the first embodiment, and thus the description thereof will be omitted.

Third Embodiment

FIG. 15 is a view showing an exemplary configuration of a communication apparatus 221 according to a third embodiment of the present invention. As shown in FIG. 15, the communication apparatus 221 includes a transmission section 23, a reception section 24, and a communication control section 222 for performing general communication control such as determination of a transmission timing based on CSMA/CA and a frame identification process. The communication control section 222 includes a back-off process section 125, a medium information obtaining section 226, a medium state determination section 227, and an information storage section 28. The medium information obtaining section 226 includes a source address management table 261. The transmission section 23, the reception section 24, the information storage section 28, the back-off process section 125 are the same as those of the communication apparatus 121 in the second embodiment, and thus the same reference characters are assigned thereto. Although the back-off process section 125, the medium information obtaining section 226, the medium state determination section 227, and the information storage section 28 are separated from each other for convenience of explanation, they may be combined into a single configuration if the single configuration has the same function.

The following will describe briefly the characteristics of the communication apparatus 221 prior to detailed description about an operation of the communication apparatus 221. The communication apparatus 221 differs from the communication apparatus 21 according to the first embodiment in not performing a pseudo back-off process. The communication apparatus 221 has a characteristic of determining a medium occupation state by observing the source address of a frame being transmitted through a medium, not determining a medium occupation state by performing the pseudo back-off process.

Figure 16:
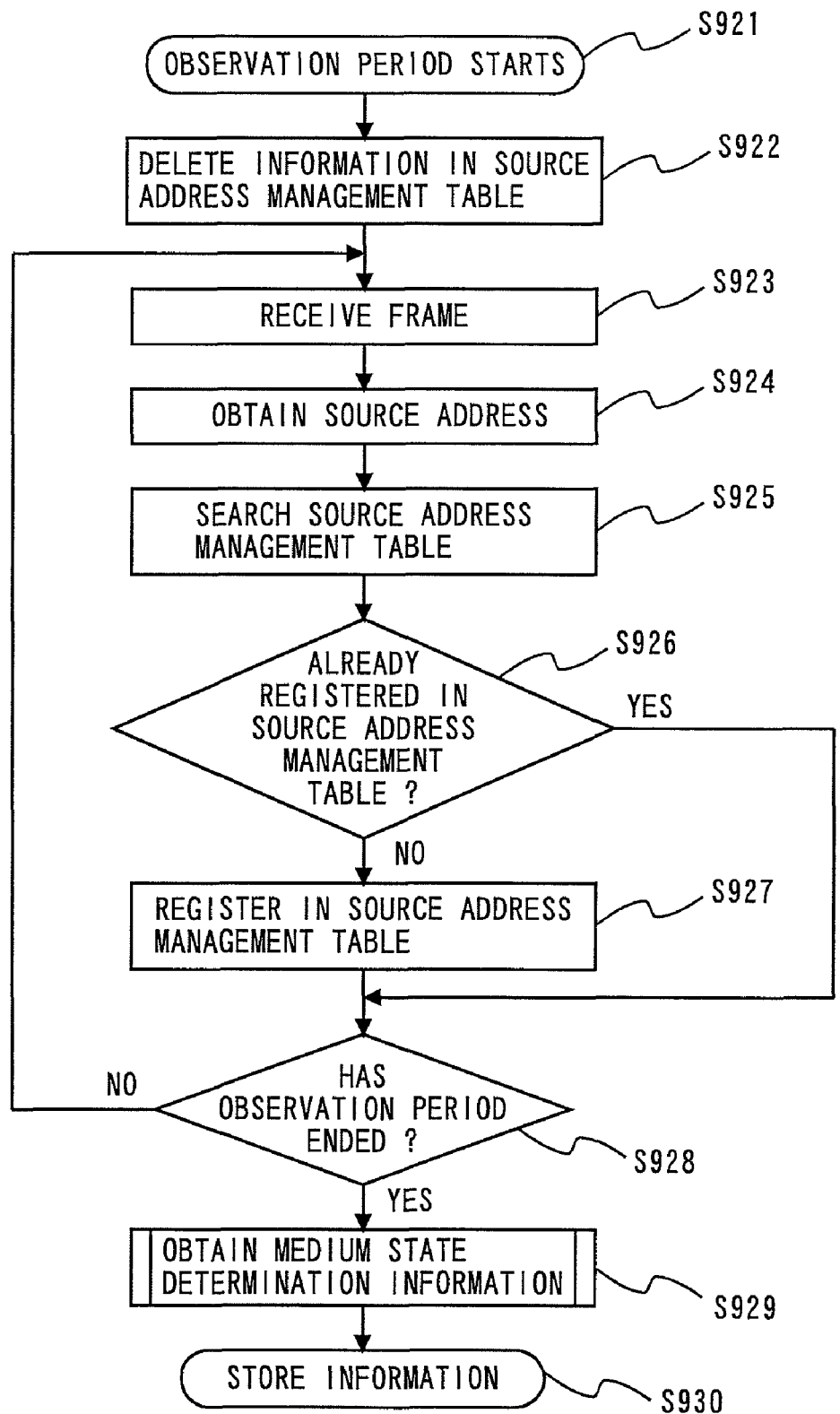
FIG. 16 is a flow chart for the communication apparatus 221 to observe a medium state and obtain determination information.

FIG. 16 is a flow chart for the communication apparatus 221 to observe a medium state and obtain determination information. The following will described in detail an operation of the communication apparatus 221 with reference to FIGS. 10 and 11 used in the second embodiment and FIGS. 15 and 16. The following description will be made focusing on an operation of the terminal A. As already described, the source address information of the header region of a frame being transmitted through the medium can be demodulated by all terminals in the communication system (see FIG. 10).

When an observation period starts (a step S921), the medium information obtaining section 226 (see FIG. 15) deletes all information in the source address management table 261 (a step S922). Next, the reception section 24 receives the frame 171 (see FIG. 11) (a step S923), demodulates and obtains the source address information of the header region shown in FIG. 10 (a step S924), and notifies the medium information obtaining section 226 of the obtained source address information. The medium information obtaining section 226 searches the source address management table for the address of the terminal B (see FIG. 11) which is the notified source address information of the frame 171 (a step S925). Next, the medium information obtaining section 226 determines whether or not the address of the terminal B has been registered in the source address management table

261 (a step S926). When the address of the terminal B has been registered, the process shifts to a step S928. When the address of the terminal B has not been registered, the process shifts to a step S927, and the medium information obtaining section 226 registers the address of the terminal B in the source address management table 261 (the step S927). Next, the medium information obtaining section 226 determines whether or not the observation period has ended (the step S928). Because the observation period has not ended, the process returns to the step S923. Then, similarly, the communication apparatus 221 repeats the steps S923 to S928, and the addresses of the terminal B, the terminal C, and the terminal A are registered in the source address management table 261. Here, the address of the focused terminal A is registered. Next, the medium information obtaining section 226 determines that the observation period has ended (the step S928), and notifies the medium state determination section 227 of the number (3) of source addresses registered in the source address management table 261. The medium state determination section 227 obtains later-described determination information from the notified number of source addresses (a step S929). Here, the number (3) of source addresses registered in the source address management table 261 indicates the number (3) of terminals in operation during the observation period.

Figure 17:
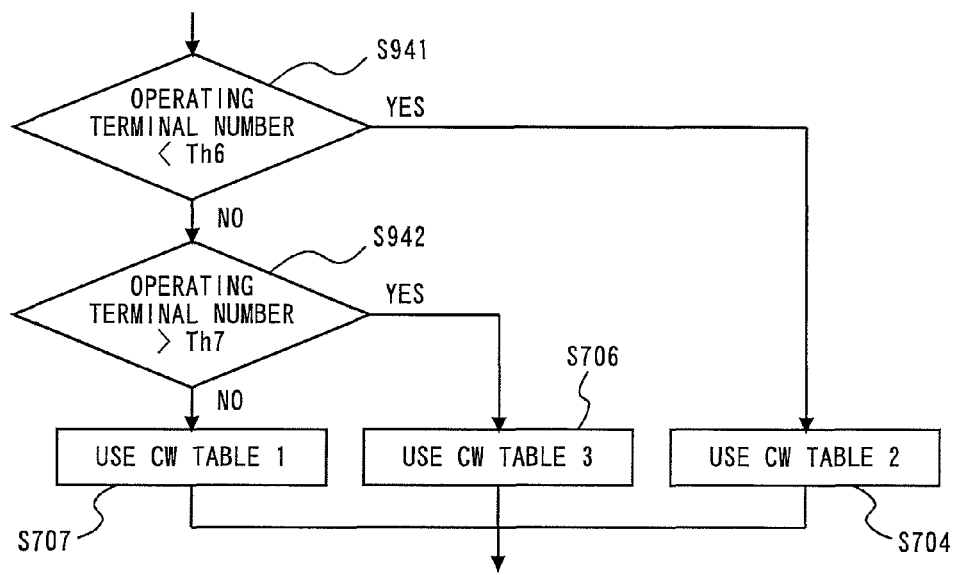
FIG. 17 is a flow chart for a medium state determination section 227 to obtain, at a step S929 in FIG. 16, determination information for determining a CW table used by a back-off process section 125.

FIG. 17 is a flow chart for the medium state determination section 227 to obtain, at the step S929 in FIG. 16, determination information for determining a CW table used by the back-off process section 125. In the flow chart in FIG. 17, the step S702 in the flow chart shown in FIG. 6 explained in the first embodiment is removed, and the steps S703 and S705 in the flow chart in FIG. 6 are replaced with steps S941 and S942, respectively. In the flow chart in FIG. 17, the same steps as those in the flow chart in FIG. 6 are indicated by the same reference characters.

When the ending of the observation period is confirmed at the step S928 shown in FIG. 16, the medium state determination section 227 compares a predetermined operating terminal number threshold Th6 with the operating terminal number (3), and when the operating terminal number (3) is smaller than the operating terminal number threshold Th6, the medium state determination section 227 determines that the number of terminals currently in operation is small, and the process shifts to a step S704 (the step S941). In this case, the medium state determination section 227 obtains medium state determination information which causes the CW table used by the back-off process section 125 for the regular back-off process to be the CW table 2 in FIG. 5 explained in the first embodiment (the step S704). On the other hand, when the operating terminal number (3) is larger than the operating terminal number threshold Th6 as the result of the comparison between the operating terminal number threshold Th6 and the operating terminal number (3) by the medium state determination section 227, the process shifts to the step S942 (the step S941). In this case, the medium state determination section 227 compares a predetermined operating terminal number threshold Th7 (Th6<Th7) with the operating terminal number (3), and when the operating terminal number (3) is larger than the operating terminal number threshold Th7, the medium state determination section 227 determines that the number of terminals currently in operation is large, and the process shifts to a step S706 (the step S942). In this case, the medium state determination section 227 obtains determination information which causes the CW table used by the back-off process section 125 for the regular back-off process to be the CW table 3 in FIG. 5 (the step S706). On the other hand, when the operating terminal number (3) is smaller than the operating terminal number threshold Th7 as the result of the comparison between the operating terminal number threshold Th7 and the operating terminal number (3) by the medium state determination section 227, the process shifts to a step S707 (the step S942). In this case, the medium state determination section 227 obtains determination information which causes the CW table used by the back-off process section 125 for the regular back-off process to be the CW table 1 in FIG. 5 (the step S707). As described above, the medium state determination section 227 obtains the determination information for determining the CW table used by the back-off process section 125 (the step S929 in FIG. 16), and notifies the information storage section 28 of the determination information.

Next, the information storage section 28 stores therein the determination information obtained at the step S929 (a step S930 in FIG. 16). At the same time, the information storage section 28 notifies the back-off process section 125 of the determination information. Next, in accordance with the determination information, the back-off process section 125 uses any one of the CW tables 1 to 3 (see FIG. 5) included in advance therein for the regular back-off process. It is noted that the communication apparatus 221 may not include the information storage section 28, and the medium state determination section 227 may directly notify the back-off process section 125 of the determination information.

As described above, when determining that the observation period has ended (the step S928), each terminal (each communication apparatus 221) in the communication system determines the CW table used by the back-off process section 125 when performing the regular back-off process. Here, the length of the observation period of each terminal is desired to be equal to those of the other terminals and to be sufficiently large. Thus, each terminal calculates the same operating terminal number, and determines a CW table in accordance with the operating terminal number for use. As a result, each terminal basically uses a CW table having the same content.

Here, each CW table shown in FIG. 5 has the characteristics as described in the first embodiment. Thus, as described in the first embodiment, equality of a transmission chance is improved among each terminal, and the throughput of the whole communication system is improved.

As described above, the communication apparatus 221 according to the third embodiment appropriately selects a CW table in an autonomous distributed manner by obtaining the source addresses from the frames in the medium and determining the medium occupation state. As a result, the communication apparatus 221 can obtain the same effect as the communication apparatus 21 according to the first embodiment. Further, because the communication apparatus 221 does not perform the pseudo back-off process unlike the communication apparatus 21 according to the first embodiment, the communication apparatus 221 can significantly reduce internal processing, and can have a simple configuration.

Figure 18:
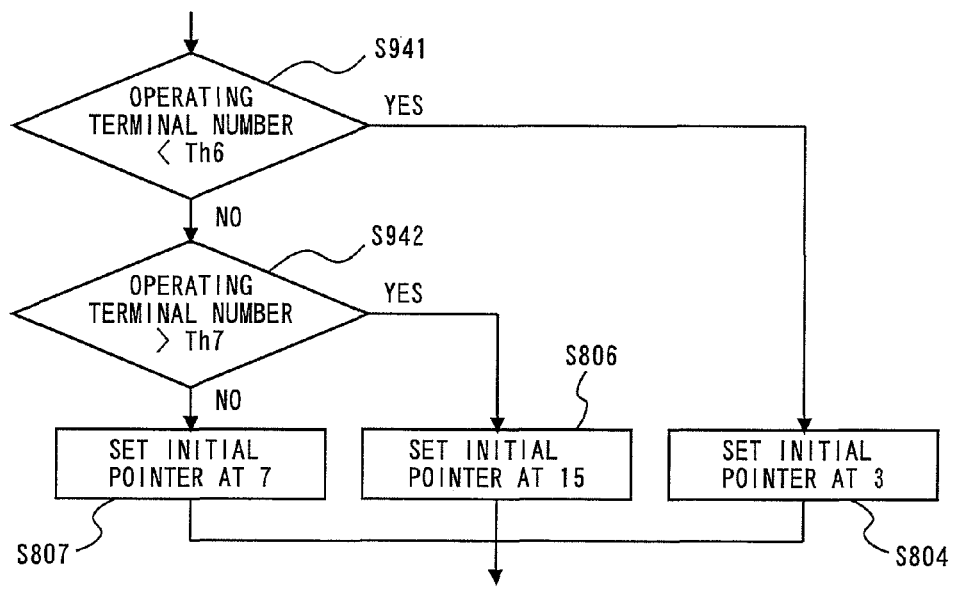
FIG. 18 is a flow chart for obtaining determination information when the CW table 4 shown in FIG. 7 is used.

As described in the second application example of the first embodiment, instead of a plurality of CW tables (or calculation formulas), one CW table may be used (see FIGS. 7 and 8). FIG. 18 is a flow chart for obtaining determination information when the CW table 4 shown in FIG. 7 is used. In the flow chart in FIG. 18, the steps S707, S706, and S704 in the flow chart in FIG. 17 are replaced with steps S807, S806, and S804, respectively. Here, the steps S807, S806, and S804 are the same as those explained with FIGS. 7 and 8 in the second application example of the first embodiment, and thus the description thereof will be omitted.

INDUSTRIAL APPLICABILITY

The present invention can be used in a communication apparatus which uses an access method for avoiding collision of transmission frames by back-off control, and the like, and is particularly useful in a contention distributed control system when the throughput of the whole system is desired to be improved while equality of a transmission chance is maintained among communication apparatuses.

The invention claimed is:

1. A communication apparatus, used within a communication system, for avoiding collision of a transmission frame, transmitted by another communication apparatus in the same communication system, in a transmission line medium using a back-off process, the communication apparatus comprising:
 a back-off process section for performing, using a contention window, a regular back-off process which is performed at transmission of a transmission frame and a pseudo back-off process which is performed by simulating transmission of pseudo transmission frames, which are not actually transmitted, at the completion of the pseudo back-off process regardless of whether the transmission line medium remains idle at the completion of the pseudo back-off process, when the communication apparatus does not have a frame to be transmitted;
 a medium information obtaining section for obtaining, by the pseudo back-off process, medium information indicative of a state of the transmission line medium when the communication apparatus does not have a frame to be transmitted; and
 a medium state determination section for determining the state of the transmission line medium using the medium information to obtain determination information,
 wherein the medium information includes at least one of a trial number value of the pseudo back-off process, a contention loss number value indicative of a number of times which a pseudo transmission frame has not been transmitted, a contention win number value indicative of a number of times which the pseudo transmission frame has been transmitted, and a collision number value indicative of a number of times of collision of the pseudo transmission frame and the transmission frame in the transmission line medium.

2. The communication apparatus according to claim 1, wherein the determination information is information indicative of a contention window table or a calculation formula which is selected in accordance with a contention success probability obtained by dividing the contention win number value by the trial number value or a contention failure probability obtained by dividing the contention loss number value by the trial number value, and
 a size of the contention window is determined by the selected contention window table or calculation formula.

3. The communication apparatus according to claim 2, wherein the communication apparatus notifies other communication apparatuses in the communication system of the determination information.

4. The communication apparatus according to claim 1, wherein the determination information is an initial value for a size of the contention window which initial value is selected in accordance with a contention success probability obtained by dividing the contention win number value by the trial number value or a contention failure probability obtained by dividing the contention loss number value by the trial number value.

5. The communication apparatus according to claim 4, wherein the communication apparatus notifies other communication apparatuses in the communication system of the determination information.

6. The communication apparatus according to claim 1, wherein the determination information is a collision probability obtained by dividing the collision number value by the trial number value, and
 calculation of a transmission line change is performed using a change amount of an occurrence rate of retransmission which is attributable to a change of a transmission line state and obtained by multiplying an occurrence rate of retransmission of the transmission frame by a value obtained by subtracting the collision probability from 1.

7. A communication method, used within a communication system, for avoiding collision of a transmission frame, transmitted by a communication apparatus in the same communication system, in a transmission line medium using a back-off process, the communication method comprising:
 performing, using a contention window, a regular back-off process which is performed at transmission of a transmission frame and a pseudo back-off process which is performed by simulating transmission of pseudo transmission frames, which are not actually transmitted, at the completion of the pseudo back-off process regardless of whether the transmission line medium remains idle at the completion of the pseudo back-off process, when a communication apparatus does not have a frame to be transmitted;
 obtaining, by the pseudo back-off process, medium information indicative of a state of the transmission line medium when the communication apparatus does not have a frame to be transmitted; and
 determining the state of the transmission line medium using the medium information to obtain determination information,
 wherein the medium information includes at least one of a trial number value of the pseudo back-off process, a contention loss number value indicative of a number of times which a pseudo transmission frame has not been transmitted, a contention win number value indicative of a number of times which the pseudo transmission frame has been transmitted, and a collision number value indicative of a number of times of collision of the pseudo transmission frame and the transmission frame in the transmission line medium.

8. A non-transitory storage medium storing a program which is used by a communication apparatus, used within a communication system, for avoiding collision of a transmission frame, transmitted by another communication apparatus in the same communication system, in a transmission line medium using a back-off process, the program causing the communication apparatus to execute a method comprising:
 performing, using a contention window, a regular back-off process which is performed at transmission of a transmission frame and a pseudo back-off process which is performed by simulating transmission of pseudo transmission frames, which are not actually transmitted, at the completion of the pseudo back-off process regardless of whether the transmission line medium remains idle at the completion of the pseudo back-off process, when the communication apparatus does not have a frame to be transmitted;

obtaining, by the pseudo back-off process, medium information indicative of a state of the transmission line medium when the communication apparatus does not have a frame to be transmitted; and determining the state of the transmission line medium using the medium information to obtain determination information wherein the medium information includes at least one of a trial number value of the pseudo back-off process, a contention loss number value indicative of a number of times which a pseudo transmission frame has not been transmitted, a contention win number value indicative of a number of times which the pseudo transmission frame has been transmitted, and a collision number value indicative of a number of times of collision of the pseudo transmission frame and the transmission frame in the transmission line medium.

* * * * *